(12) United States Patent
Ishibe

(10) Patent No.: US 6,633,423 B2
(45) Date of Patent: *Oct. 14, 2003

(54) SCANNING OPTICAL SYSTEM AND IMAGE FORMING APPARATUS USING THE SAME

(75) Inventor: Yoshihiro Ishibe, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,661

(22) Filed: Jul. 6, 1999

(65) Prior Publication Data

US 2002/0008896 A1 Jan. 24, 2002

(30) Foreign Application Priority Data

Jul. 6, 1998 (JP) .......................................... 10-205907

(51) Int. Cl.[7] .............................................. G02B 26/08
(52) U.S. Cl. ...................... 359/205; 359/17; 359/206; 359/207; 359/216; 359/217
(58) Field of Search .......................... 359/17, 205, 206, 359/207, 216, 217, 218, 219, 212

(56) References Cited

U.S. PATENT DOCUMENTS

| | | | | |
|---|---|---|---|---|
| 5,710,654 A | * | 1/1998 | Ota | 359/205 |
| 5,805,323 A | * | 9/1998 | Ichikawa | 359/205 |
| 5,838,480 A | * | 11/1998 | McIntyre | 359/205 |
| 5,900,964 A | * | 5/1999 | Iizuka | 359/207 |
| 5,940,200 A | * | 8/1999 | Iizuka | 359/206 |
| 5,963,356 A | * | 10/1999 | Kato | 359/216 |
| 6,038,053 A | * | 3/2000 | Kato | 359/205 |

* cited by examiner

*Primary Examiner*—John Juba
*Assistant Examiner*—Leo Boutsikaris
(74) *Attorney, Agent, or Firm*—Fitzpatrick, Cella, Harper & Scinto

(57) ABSTRACT

A scanning optical system includes a first optical system for shaping a light beam emitted from a light source and forming the light beam into a linear image elongated in the same direction as a main scanning direction, a light deflector which has a deflection surface near an imaging position of the first optical system and deflects/scans the incident light beam in the main scanning direction, a second optical system for forming the light beam deflected by the light deflector into an image on a scanned surface in the main scanning direction, and a third optical system for forming the light beam deflected by the light deflector into an image on the scanned surface in a sub-scanning direction and setting the deflection surface of the light deflector and the scanned surface optically conjugate with each other. The light beam guided by the first optical system is made to strike said light deflector at a predetermined angle with respect to a plane perpendicular to a rotation axis of the light deflector. A shape of at least one surface of a main scanning cross-section of a lens constituting the second optical system is formed into a non-arcuated shape. A diffraction optical element having a refracting power at least in the main scanning direction is formed in at least one of the first and second optical systems.

18 Claims, 19 Drawing Sheets

SURFACE VERTEX IN SUB SCANNING CROSS SECTION

LIGHT BEAM

SUB SCANNING DIRECTION

PARALLEL

MAIN SCANNING SURFACE

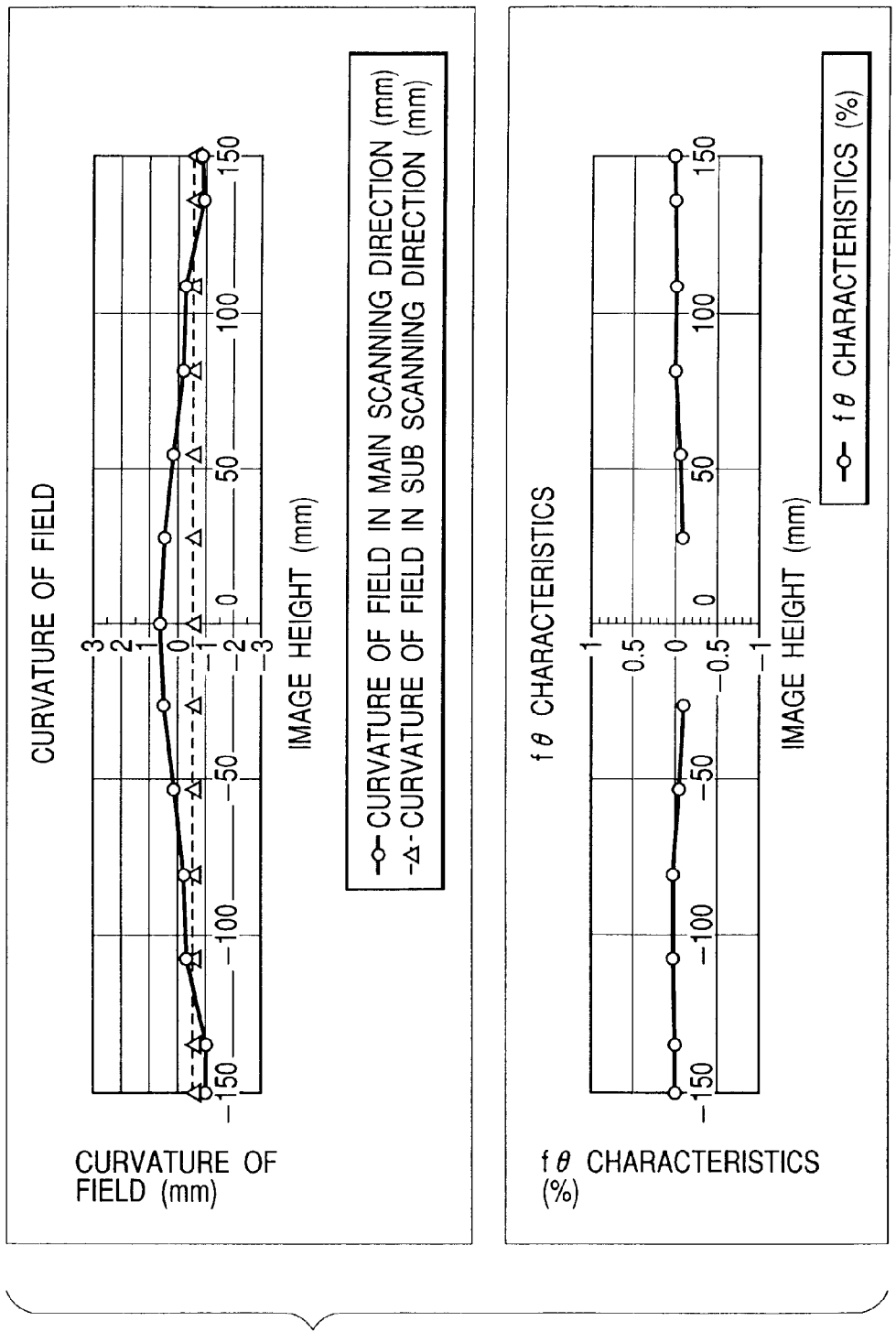

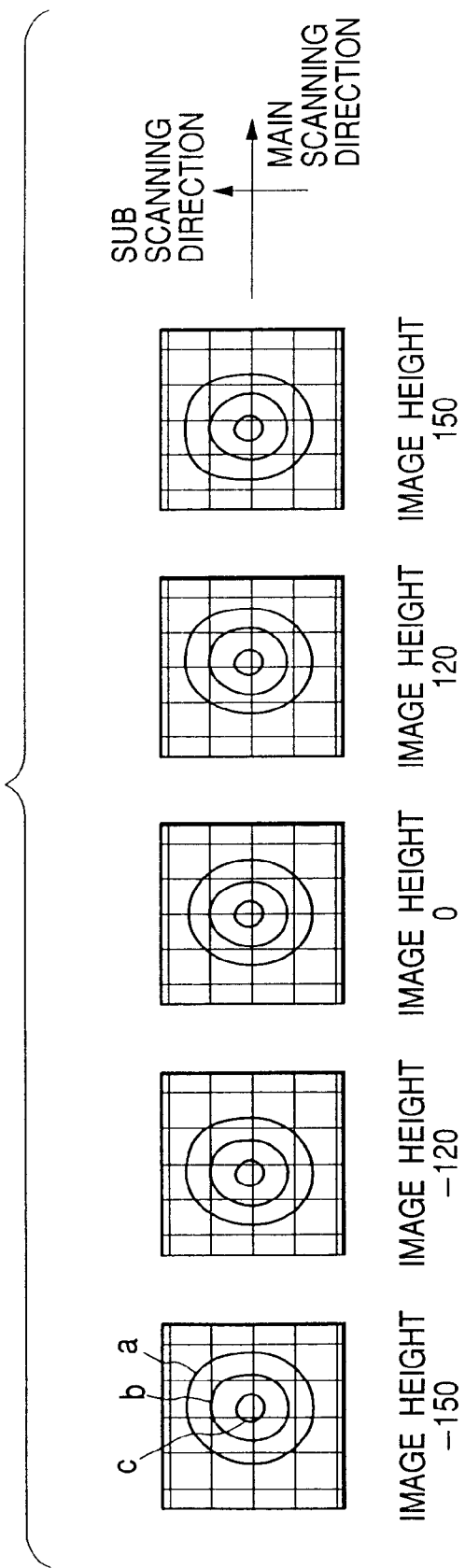

SCANNING OPTICAL SYSTEM AND IMAGE FORMING APPARATUS USING THE SAME

BACKGROUND OF THE INVENTION

1. Field of the Invention

The present invention relates to a scanning optical system and an image forming apparatus using the same and, more particularly, to a scanning optical system suited to an apparatus, such as a laser beam printer (LBP) or digital copying machine, which makes the light beam emitted from a light source means strike a light deflector at a predetermined angle with respect to a plane perpendicular to the rotation axis of the light deflector, deflects the light beam, and scans it on a scanned surface, thereby recording image information.

2. Related Background Art

Various scanning optical systems are disclosed in, for example, Japanese Patent Application Laid-open Nos. 7-27991 and 9-230274, which make the light beam emitted from a light source means strike a polygon mirror as a light deflector at a predetermined angle with respect to a plane perpendicular to the rotation axis of the light deflector, deflect/reflect the light beam, and scan it on a scanned surface, thereby recording image information.

According to Japanese Patent Application Laid-open No. 7-27991, in the scanning optical system which makes the light beam emitted from the light source means strike the polygon mirror at a predetermined angle with respect to a plane perpendicular to the rotation axis of the polygon mirror, deflects/reflects the light beam, and scans it on a scanned surface through a scanning lens, thereby recording image information, a post objective optical system is disclosed, in which a main scanning cross-section of a deflection surface (polygon surface) of the polygon mirror has an elliptic shape, and only the incident surface of the scanning lens is shaped to be displaced in the sub-scanning direction (a direction perpendicular to a main scanning plane which is a plane scanned by the light beam deflected/reflected by the polygon mirror).

According to Japanese Patent Application Laid-open No. 9-230274, in the scanning optical system which makes the light beam emitted from the light source means strike the polygon mirror at a predetermined angle with respect to a plane perpendicular to the rotation axis of the polygon mirror, deflects/reflects the light beam, and scans it on a scanned surface through a cylindrical lens or cylindrical mirror, thereby recording image information, an optical system is disclosed, in which the cylindrical lens or cylindrical mirror is positioned to make the light beam to be incident on the cylindrical lens or cylindrical mirror it at a predetermined height away from the baseline.

However, various problems are posed in the above conventional scanning optical systems, as described below.

The scanning optical system disclosed in Japanese Patent Application Laid-open No. 7-27991 is the post objective optical system in which the light beam emitted from the light source strikes the polygon mirror at a predetermined angle with respect to a plane perpendicular to the rotation axis of the polygon mirror, and the light beam is incident on the polygon mirror from the center in the deflection angle of the polygon mirror in the main scanning direction. A main scanning cross-section of a deflection surface of the polygon mirror is formed into an elliptic shape, and the incident surface of the scanning lens is shaped to be displaced in the sub-scanning direction.

In an optical system using such an incidence method, i.e., a so-called sub-scanning oblique incident optical system, the surface formed by the light beam deflected/reflected by the deflection surfaces does not become a plane but becomes a conical surface. When such a light beam strikes the scanning lens, the light beam incident positions shift from each other on the central portion and two end portions of the lens in the sub-scanning direction. In this reference, the resultant spot shape deformation is corrected by displacing the incident surface of the scanning lens in the sub-scanning direction, but no correction is made for fθ characteristics. Therefore, the fθ characteristics are corrected by continuously changing the oscillation timing of the semiconductor laser. If, however, such a correction is performed, since the scanning speed on the scanned surface is not constant, the amount of light on the scanned surface varies. If the emission time is continuously changed as well as the oscillation timing to keep the amount of light uniform, the apparent spot diameter changes in the main scanning direction. This makes it difficult to obtain good optical performance. Furthermore, since an elliptic polygon mirror is used as a deflection surface, the cost required to process mirror surfaces is high.

According to Japanese Patent Application Laid-open No. 9-230274, curvature of field is corrected by positioning the cylindrical lens or cylindrical mirror to make a light beam strike the cylindrical lens or cylindrical mirror at a predetermined height away from the baseline. However, no consideration is given to the above spot shape deformation. In addition, in a scanning optical system having an arrangement like the one disclosed in the reference, satisfactory optical performance cannot be obtained only by simply correcting curvature of field alone, because spot shape deformation like the one described above occurs. In addition, in an over field type scanning optical system like the one disclosed in this reference, in order to minimize the above spot shape deformation, set a small oblique incident angle in the sub-scanning direction so as to minimize light amount variations, spot diameter changes, and the like throughout the scanning range, and send a light beam onto the polygon mirror from substantially the center in the deflection angle of the polygon mirror, an arrangement a (so-called double path) is often employed, in which the light beam to be incident on the polygon mirror is temporarily made to strike the scanning lens, and the light beam deflected/reflected by a deflection surface of the polygon mirror is incident on the scanning lens again. In this arrangement, in which the light beam passes through the scanning lens twice, an image plane greatly moves in the main scanning direction unless the surface precision of the scanning lens is strictly managed. In an over field type double path optical system like the one disclosed in this reference, therefore, a scanning lens is made up of about two optical glass members which can be formed with high precision relatively easily and are resistant to environmental variations. However, a plastic material which is inexpensive but inferior to a glass material in environmental characteristics cannot be used for a scanning lens.

SUMMARY OF THE INVENTION

It is an object of the present invention to provide an optical scanning system in which a reduction in cost and proper correction of fθ characteristics, curvature of field, and the like are realized by forming a scanning lens as a second optical system using one plastic lens in a sub-scanning oblique incident optical system, and more specifically, an over field scanning optical system, and properly setting the shape of the lens, spot deformation due to oblique incidence of light in the sub-scanning direction is effectively corrected by forming a correction lens as a third optical system by using a single plastic lens and optimizing its shape, position, and the like, and a diffraction optical element is formed in at least the first or second optical system, thereby realizing high environmental resistance and high quality, and an image forming apparatus using the same.

A scanning optical system of the present invention comprises:

a first optical system for shaping a light beam emitted from light source means and forming the light beam into a linear image elongated in the same direction as a main scanning direction;

a light deflector which has a deflection surface near an imaging position of the first optical system and deflects/scans the incident light beam in the main scanning direction;

a second optical system for forming the light beam deflected by the light deflector into an image on a scanned surface in the main scanning direction; and a third optical system for forming the light beam deflected by the light deflector into an image on the scanned surface in a sub-scanning direction and setting the deflection surface of the light deflector and the scanned surface optically conjugate with each other, and is characterized in that the light beam guided by the first optical system is made to strike the light deflector at a predetermined angle with respect to a plane perpendicular to a rotation axis of the light deflector, and a shape of at least one surface of a main scanning cross-section of a lens constituting the second optical system is formed into a nonarcuated shape, and a diffraction optical element having a refracting power at least in the main scanning direction is formed in at least one of the first and second optical systems.

In addition, the scanning optical system of the present invention is characterized in that the light beam incident on the light deflector is incident from a substantially center in a deflection angle of the light deflector with a width of the light beam exceeding a width of the deflection surface of the light deflector in the main scanning direction, each of the second and third optical systems comprises one lens, a material for the single lens constituting the second optical system comprises a plastic material, a material for the single lens constituting the third optical system comprises a plastic material, the diffraction optical element is formed in the first optical system, the diffraction optical element is formed in the second optical system, $|\phi 2S| \leq 0.001$ where $\phi 2S$ is a refracting power of the single lens constituting the second optical system in the sub-scanning direction, $|\phi 3M| \leq 0.001$ where $\phi 3M$ is a refracting power of the single lens constituting the third optical system in the main scanning direction, the diffraction optical element functions to cancel out an aberration variation, caused in the scanning optical system by an environmental variation, by using a variation in wavelength of the light source means due to the environmental variation, the single lens constituting the third optical system is located closer to the scanned surface than a middle position in a distance from the light deflector to the scanned surface, a radius of curvature of at least one surface of a sub-scanning cross-section of the single lens constituting the third optical system continuously changes with distance from a lens optical axis in the main scanning direction, the single lens constituting the third optical system is positioned to make a light beam strike the lens at a position shifted from a surface vertex in a sub-scanning cross-section of the lens by a predetermined amount in the sub-scanning direction, the single lens constituting the third optical system is positioned such that in a sub-scanning cross-section of the lens a light beam incident on the lens makes a predetermined angle with an optical axis of the lens in the sub-scanning cross-section, the single lens constituting the second optical system also has a function of the first optical system, two surfaces of a sub-scanning cross-section of the single lens constituting the second optical system are formed into flat shapes, two surfaces of a main scanning cross-section of the single lens constituting the third optical system are formed into arcuated shapes, or the system further comprises a bending mirror inserted in an optical path between the light source means and the light deflector.

An image forming apparatus of the present invention is characterized by forming an image by using the scanning optical system described above.

BRIEF DESCRIPTION OF THE DRAWINGS

FIG. 7 is a view for explaining the spot shapes in the first embodiment of the present invention;

DETAILED DESCRIPTION OF THE PREFERRED EMBODIMENTS

Figure 1:
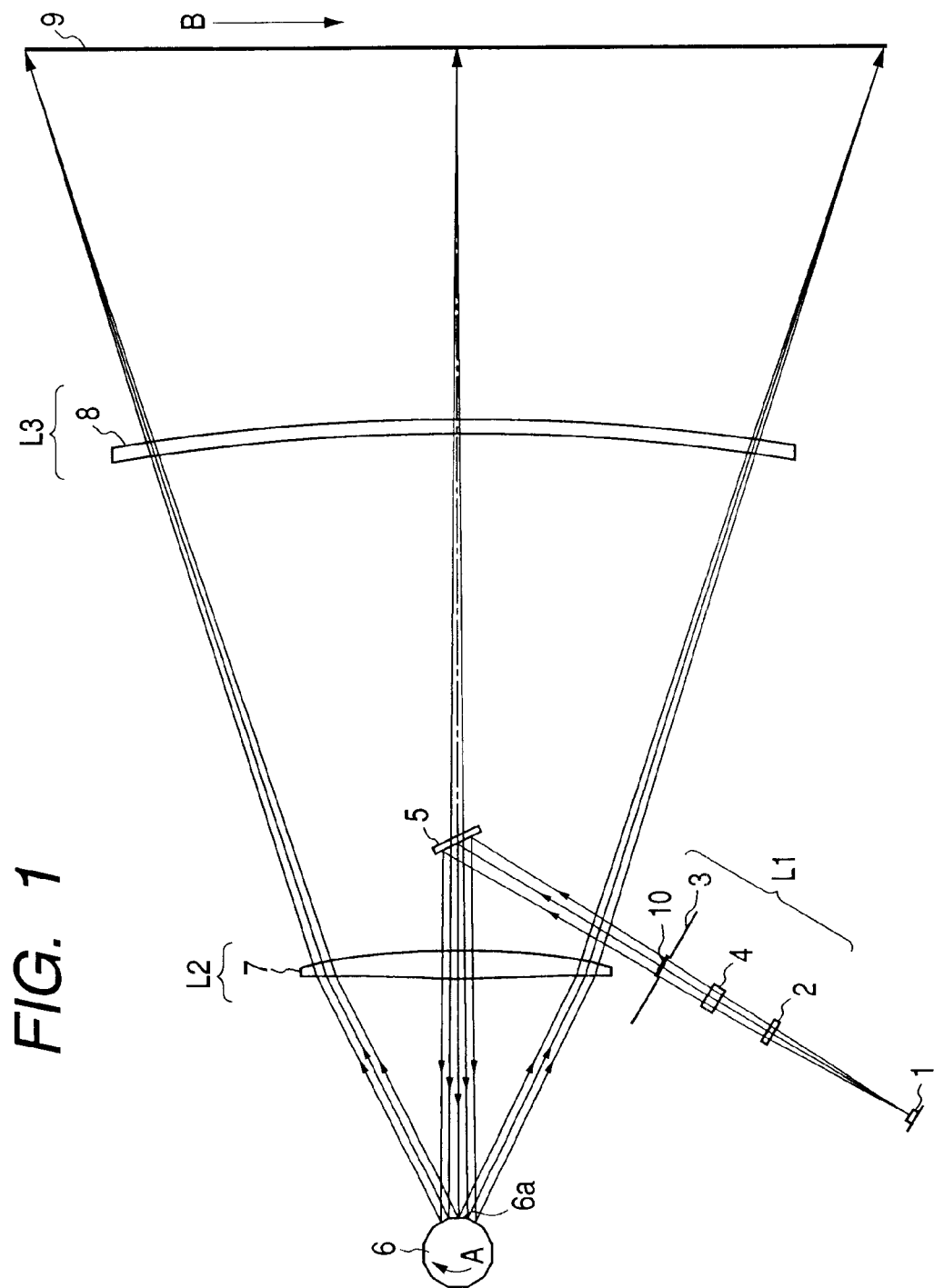
FIG. 1 is a sectional view showing the main part of the first embodiment of the present invention in the main scanning direction.
Figure 2:
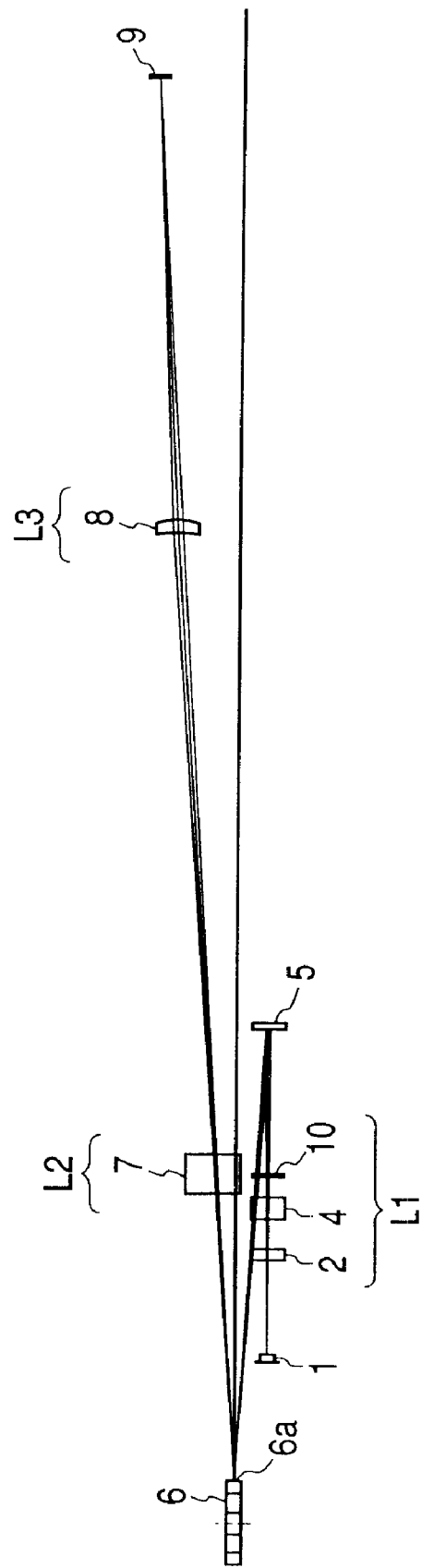
FIG. 2 is a sectional view showing the main part of the first embodiment of the present invention in the sub-scanning direction.

FIG. 1 is a sectional view showing the main part of an image forming apparatus such as a laser beam printer or digital copying machine, in the main scanning direction, to which an optical scanning system according to the first embodiment of the present invention is applied. FIG. 2 is a sectional view showing the main part of the image forming apparatus such as a laser beam printer or digital copying machine, in the sub-scanning direction, to which the optical scanning system according to the first embodiment of the present invention is applied.

Referring to FIGS. 1 and 2, for example, a semiconductor laser is used as a light source means 1. A conversion optical element (e.g., a collimator lens) 2 converts a divergent light beam emitted from the light source means 1 into a weakly divergent light beam. A cylindrical lens 4 has a predetermined refracting power in the sub-scanning direction and forms the weakly divergent light beam converted by the conversion optical element 2 into a substantially linear image (line image) elongated in the main scanning direction within a sub-scanning cross-section on a deflection (reflection) surface 6a of a polygon mirror 6 as a light deflector (to be described later). An aperture stop 3 limits a light beam passing therethrough to shape its beam shape. A diffraction optical element 10 has a positive refracting power in the main scanning direction.

Note that each element such as the collimator lens 2, cylindrical lens 4, aperture stop 3, and diffraction optical element 10 is an element of a first optical system L1. These elements are displaced from the main scanning plane by predetermined amounts. In this embodiment, they are displaced on the upper and lower sides of the page.

A bending (folding) mirror 5 having a flat shape is interposed between the light source means 1 and the light deflector 6. The bending mirror 5 is displaced downward from the main scanning plane by a predetermined amount, like the first optical system L1, and the reflection surface of the bending mirror 5 is disposed obliquely upward. This arrangement makes the light beam having passed through the first optical system L1 hit the polygon mirror 6 at a right angle (substantially the center of the deflection angle of the polygon mirror 6, i.e., substantially the center in a scanning range along the main scanning direction) in the main scanning direction and also makes the light beam strike the polygon mirror 6 from obliquely below in the sub-scanning direction. In addition, this structure makes the light beam having passed through the first optical system L1 strike the deflection surface 6a of the polygon mirror 6 with the width of the light beam exceeding the width of the deflection surface 6a in the main scanning direction (so-called over field optical system).

Note that in this specification, the main scanning plane is a plane which includes the imaging point of the line image formed by the first optical system L1 and is perpendicular to the rotation axis of the polygon mirror 6.

The polygon mirror 6 serving as a light deflector is rotated by a driving means (not shown) such as a motor at a constant angular velocity in the direction indicated by an arrow A in FIG. 1 (main scanning direction).

A scanning lens 7 serves as a second optical system L2 and is formed from a single lens made of a plastic material. This lens has almost no power in the sub-scanning direction ($|\phi 2S| \leq 0.001$ where $\phi 2S$ is the refracting power of the single lens in the sub-scanning direction), and has a power in the main scanning direction. Both the surfaces of a main scanning cross-section of the scanning lens 7 are formed into nonarcuated shapes (aspherical surfaces). The scanning lens 7 forms the light beam deflected by the polygon mirror 6 at a constant angular velocity into an image on a scanned surface 9 mainly in the main scanning direction, and performs correction to make the light beam scan on the scanned surface 9 at a constant velocity.

A correction lens 8 serves as a third optical system L3 and is formed from a single lens made of a plastic material. This lens has almost no power in the main scanning direction ($|\phi 3M| \leq 0.001$ where $\phi 3M$ is the refracting power of the signal lens in the main scanning direction), and has a power in the sub-scanning direction. The correction lens 8 is located closer to the scanned surface 9 than the middle position in the distance from the polygon mirror 6 to the scanned surface 9. The correction lens 8 forms the light beam deflected by the polygon mirror 6 into an image on the scanned surface 9 mainly in the sub-scanning direction, and sets the deflection surface 6a of the polygon mirror 6 and the scanned surface 9 optically conjugate with each other.

The scanned surface 9 is, for example, a photosensitive drum surface. When the polygon mirror 6 rotates at a constant angular velocity in the direction indicated by the arrow A in FIG. 1, and the light beam deflected/scanned by the deflection surface 6a of the polygon mirror 6 passes through the second and third optical systems L2 and L3, the light beam forms a spot on the scanned surface 9. This spot is scanned at a constant speed in the direction indicated by an arrow B in FIG. 1.

Figure 3B:
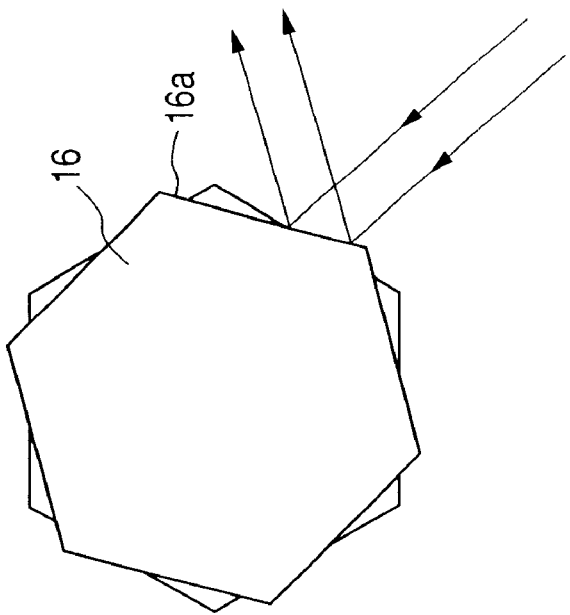
FIG. 3B is a view showing how a light beam strikes a polygon mirror in an under field optical system.
Figure 3A:
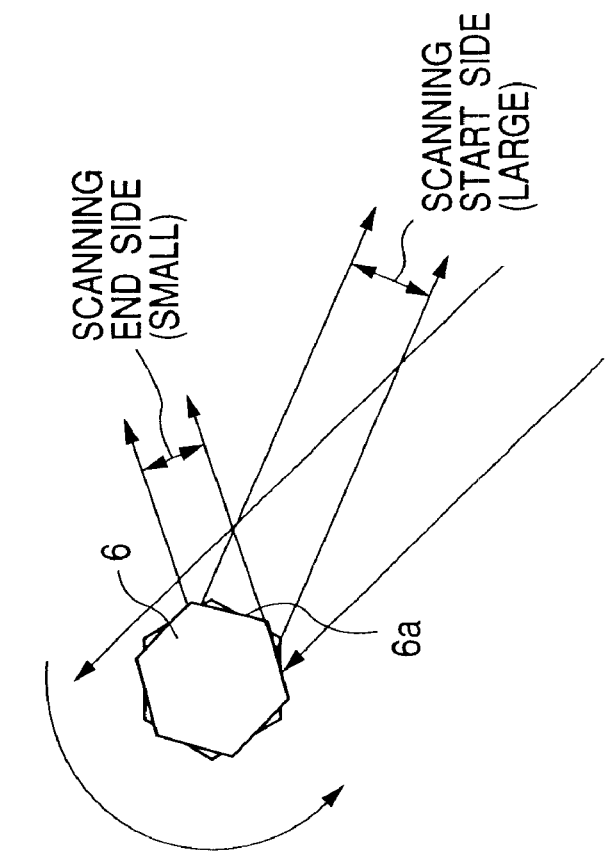
FIG. 3A is a view showing how a light beam strikes a polygon mirror in an over field optical system.

FIGS. 3A and 3B are views for explaining how light beams emitted from light source means in an under field optical system and over field optical system strike deflection surfaces of the polygon mirrors.

As shown in FIG. 3A, in the scanning optical system in this embodiment, the light beam having passed through the first optical system L1 (not shown) is incident on the deflection surface 6a of the polygon mirror 6 with the width of the light beam in the main scanning direction being larger than the width of the deflection surface 6a (so-called over field optical system).

In contrast to this, as shown in FIG. 3B, in the scanning optical system generally used in the prior art, the light beam having passed through a first optical system L1 (not shown) is incident on a deflection surface 16a of a polygon mirror 16 with the width of the light beam in the main scanning direction being smaller than the width of the deflection surface 16a a (so-called under field optical system).

As is obvious from FIGS. 3A and 3B, assuming that the widths of light beams incident on the scanning lens in the two optical systems are the same, the over field optical system can use a smaller polygon mirror and set a larger number of deflection surfaces. This offers a great advantage in increasing the speed and resolution.

In the over field optical system, however, as shown in FIG. 3A, if a light beam strikes the polygon mirror 6 in the same direction as in the under field optical system, the widths of light beams incident on the scanning lens 7 in the main scanning direction greatly differ from each other on the two end portions of a scanning range in the main scanning direction. As a consequence, the spot diameter and, hence, the light amount greatly differ between the scanning start and end sides on the scanned surface in the main scanning direction.

In this embodiment, therefore, to suppress the above difference to an allowable level, a light beam is launched to strike the polygon mirror 6 from substantially the center in the scanning range in the main scanning direction, as shown in FIG. 1. When the system uses such an incidence method, since the first optical system L1 as an incident optical system and the scanning optical system cannot be disposed in the same plane (main scanning plane), a light beam is sent to strike the polygon mirror 6 from below at a predetermined angle with respect to the main scanning plane.

In this embodiment, as described above, the scanning lens 7 as a second optical system L2 is formed from a single lens made of a plastic material, and the two surfaces of a main scanning cross-section of the lens are formed into nonarcuated shapes (aspherical surfaces). When the scanning lens 7 is formed from a single lens as in this embodiment, if the two surfaces of a main scanning cross-section of the lens are formed into simple arcuated shapes, it is difficult to satisfy both the requirements for curvature of field and fθ characteristics. For this reason, at least one surface of the main scanning cross-section of the lens must be formed into a nonarcuated shape.

In this embodiment, therefore, to properly correct both curvature of field and fθ characteristics, the two surfaces of a main scanning cross-section of the scanning lens 7 are formed into nonarcuated shapes. In addition, the two surfaces of a sub-scanning cross-section of the scanning lens are shaped to have an infinite radius of curvature (i.e., flat shapes) so as not to have any refracting power in the sub-scanning direction.

In this embodiment, as described above, the correction lens 8 as the third optical system L3 is formed from a single lens made of a plastic material. This lens has almost no power in the main scanning direction but has a power only in the sub-scanning direction. The lens is located closer to the scanned surface 9 than the middle position in the distance from the polygon mirror 6 to the scanned surface 9. The correction lens 8 forms the light beam deflected/reflected by the polygon mirror 6 into an image on the scanned surface 9 mainly in the sub-scanning direction, and sets the deflection surface 6a of the polygon mirror 6 and the scanned surface optically conjugate with each other.

In this case, when an environmental variation, and more specifically, a change in ambient temperature, occurs in the apparatus, a focus shift occurs in the sub-scanning direction owing to a change in the refractive index of the plastic material for the correction lens 8. This focus shift amount can be suppressed to an amount that causes no practical problem by decreasing the imaging magnification based on the deflection surface 6a of the polygon mirror 6 and the scanned surface 9.

In this embodiment, therefore, an imaging magnification of 1 or more is realized by locating the correction lens 8 closer to the scanned surface 9 than the middle position in the distance from the polygon mirror 6 to the scanned surface 9. This suppresses any focus shift in the sub-scanning direction to a level that causes no practical problem even if the ambient temperature changes.

In this embodiment, the two surfaces of a sub-scanning cross-section of the scanning lens 7 are formed to have an infinite radius of curvature (i.e., flat shapes) to suppress any focus shift in the sub-scanning direction due to a change in ambient temperature. If the shape of a sub-scanning cross-section of the scanning lens 7 is the same as that in the main scanning direction, the lens has the same power in the sub-scanning direction as in the main scanning direction. Since the scanning lens 7 is located relatively near the polygon mirror 6, if a power is present in the sub-scanning direction, it is difficult to decrease the imaging magnification. For this reason, in this embodiment, the two surfaces of the sub-scanning cross-section of the scanning lens 7 are shaped to have an infinite radius of curvature to actively decrease the imaging magnification, thereby suppressing any focus shift in the sub-scanning direction to a level that poses no practical problem.

The correction lens 8 in this embodiment is set such that the radius of curvature of a sub-scanning cross-section of the lens surface on the scanned surface 9 side continuously changes with distance from the lens optical axis in the main scanning direction. If the radius of curvature of the sub-scanning cross-section of the correction lens 8 remains the same, i.e., the correction lens 8 has a simple toric shape, curvature of field remains in the sub-scanning direction. The curvature of field in the sub-scanning direction can be suppressed by positioning the correction lens 8 near the scanned surface 9. If, however, the correction lens 8 is located too close to the scanned surface 9, the correction lens 8 is undesirably elongated in the main scanning direction.

In this embodiment, therefore, the curvature of field in the sub-scanning direction is properly corrected throughout the entire image range by continuously changing the radius of curvature of the sub-scanning cross-section of the lens surface of the correction lens 8 located on the scanned surface side with distance from the lens optical axis in the main scanning direction.

In a so-called sub-scanning oblique incident optical system like this embodiment, as described above, the surface formed by the light beam deflected/reflected by the deflection surface 6a does not become a flat surface but becomes a conical surface. As a consequence, the light beam is incident with a skew (obliquely incident) on the scanning lens 7 and correction lens 8. For this reason, the aberration caused by the skew incidence adversely affects the spot shape and degrades it especially on an end portion in the main scanning direction. As a consequence, a desired spot diameter cannot be obtained. In addition, owing to the influences of the above skew incidence, curvature of a scanning line simultaneously occurs on the scanned surface 9.

Figure 4A:
FIGS. 4A and 4B are views showing how a light beam strikes a correction lens in the first embodiment of the present invention.

In this embodiment, therefore, the correction lens 8 is inserted to make a light beam strike at a position, on the correction lens 8, which is shifted from a surface vertex in a sub-scanning cross-section of the correction lens 8 by a predetermined amount, thereby effectively correcting a deterioration in spot shape due to the above skew incidence of light. More specifically, as shown in FIG. 4A, a deterioration in spot shape on a scanning end portion in the main scanning direction is corrected by making a light beam strike at a position, on the correction lens 8, which is located above the surface vertex in the sub-scanning cross-section of the correction lens 8 in the sub-scanning direction.

Figure 4B:
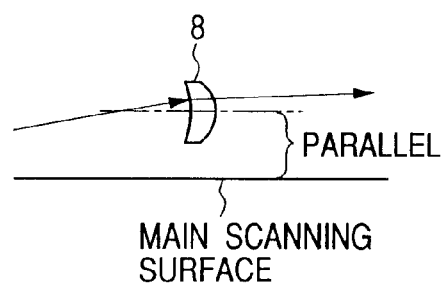

In addition, in this embodiment, curvature of a scanning line on the scanned surface 9 is corrected by setting (disposing) the correction lens 8 such that in the sub-scanning cross-section the light beam incident on the correction lens 8 makes a predetermined angle with the optical axis of the correction lens 8 in the sub-scanning cross-section. More specifically, as shown in FIG. 4B, the correction lens 8 is set (disposed) such that the optical axis of the correction lens 8 within the sub-scanning cross-section and a main scanning plane become parallel to each other, thereby allowing the light beam incident on the correction lens 8 and the optical axis of the correction lens 8 within the sub-scanning cross-section make the predetermined angle with each other within the sub-scanning cross-section. Curvature of a scanning line on the scanned surface 9 is corrected by arranging the correction lens 8 having a power in the sub-scanning direction in this manner.

In this embodiment, the diffraction optical element 10 having a positive power in the main scanning direction is inserted immediately after the aperture stop 3 as one of the constituent elements of the first optical system L1. The diffraction optical element 10 functions to cancel out aberration variations of the scanning lens 7, caused by environmental variations of the apparatus, and more specifically, ambient temperature changes, by using wavelength variation of the semiconductor laser 1 as a light source means which are caused by environmental variations, and more specifically, ambient temperature changes.

Since the scanning lens 7 is formed from a single lens made of a plastic material as described above, when the apparatus undergoes an environmental variation, an ambient temperature change, in particular, a focus shift occurs in the main scanning direction owing to a change in the refractive index of the plastic material for the scanning lens 7. More specifically, when the ambient temperature rises, the refractive index of the plastic material for the scanning lens 7 decreases. As a result, the focus in the main scanning direction shifts backward from the scanned surface 9.

When the ambient temperature rises, the oscillation wavelength of the semiconductor laser 1 generally increases (the wavelength shifts to longer wavelength side). If the wavelength of an incident light beam increases (the wavelength shifts to longer wavelength side) while the grating pitch of the diffraction optical element 10 remains the same, the focal length of the diffraction optical element 10 generally decreases. As a consequence, the focus in main scanning direction shifts forward from the scanned surface 9.

In this embodiment, the ratio of the power of the scanning lens 7 in the main scanning direction to the power of the diffraction optical element 10 in the main scanning direction is properly set such that the focus shift amount of the scanning lens 7 in the main scanning direction cancels out the focus shift amount of the diffraction optical element 10 in the main scanning direction so as to prevent a focus shift in the main scanning direction.

Table 1 shows an optical configuration in this embodiment, the aspherical coefficients of the scanning lens 7 and correction lens 8, and the phase terms of the diffraction optical element.

TABLE 1

| | | |
|---|---|---|
| Wavelength Used | $\lambda$ (nm) | 780 |
| Distance between Light Source and First Surface of Collimator lens | d0 (mm) | 65.00 |
| Thickness of Collimator Lens | d1 (mm) | 3 |
| Distance between Second Surface of Collimator Lens and First Surface of Cylindrical Lens | d2 (mm) | 20 |
| Thickness of Cylindrical Lens | d3 (mm) | 7 |
| Distance between Second Surface of Cylindrical Lens and Diffraction Optical Element Surface | d4 (mm) | 20 |
| Distance between Diffraction Optical Element Surface and Polygon Surface | d5 (mm) | 230.00 |
| Distance between Polygon Surface and First Surface of Scanning Lens | d6 (mm) | 89.22 |
| Thickness of Scanning Lens | d7 (mm) | 11.63 |
| Distance between Second Surface of Scanning Lens and First Surface of Correction Lens | d8 (mm) | 198.00 |
| Thickness of Correction Lens | d9 (mm) | 4.00 |
| Distance between Second Surface of Correction Lens and Scanned Surface | d10 (mm) | 140.22 |
| Refractive Index of Collimator Lens | Ncol | 1.78565 |
| Refractive Index of Cylindrical Lens | Ncyl | 1.51072 |
| Refractive Index of Scanning Lens | Nlens1 | 1.52420 |
| Refractive Index of Correction Lens | Nlens2 | 1.52420 |
| Radius of Curvature of First Surface of Collimator Lens | R1col (mm) | 0.000 |
| Radius of Curvature of Second Surface of Collimator Lens | R2col (mm) | −62.600 |
| Radius of Curvature of Second Surface of Cylindrical Lens | R1cyl (mm) | 0.000 |
| Radius of Curvature of Second Surface of Cylindrical Lens (Main Scanning) | R2cyl (m) (mm) | 0.000 |
| Radius of Curvature of Second Surface of Cylindrical Lens (Sub-scanning) | R2cyl (s) (mm) | −80.850 |
| Shifting Amount of Correction Lens in Sub-scanning Direction | $\Delta$ (mm) | 8.00 |
| Polygon Surface Incident Angle in Sub-scanning Direction | $\alpha$ (deg.) | 2 |
| Polygon Surface Maximum Exit Angle | $\theta$max (deg.) | 27 |
| Polygon (Diameter $\phi$ mm) $\phi$27 12 surfaces | | |
| Aperture Stop Position | | 20 mm away from cylindrical lens toward polygon side |
| Diameter of Aperture Stop | | 1.8 mm in Sub-scanning Direction |

Scanning Lens

| | First Surface | | Second Surface |
|---|---|---|---|
| R (mm) | 375.683 | R (mm) | −343.863 |
| k | 5.993E + 00 | k | −3.976E + 01 |
| B4 | −4.492E − 09 | B4 | −6.796E − 08 |
| B6 | −1.180E − 10 | B6 | −7.408E − 11 |
| B8 | 7.172E − 15 | B8 | −6.572E − 15 |
| B10 | 7.873E − 19 | B10 | 1.461E − 18 |

Correction Lens

| | First Surface | | Second Surface |
|---|---|---|---|
| R (mm) | −1000.00 | R (mm) | −1000.000 |
| r (mm) | −142.976 | r (mm) | −37.357 |
| D2 | 0.000E + 00 | D2 | 6.000E − 06 |
| D4 | 0.000E + 00 | D4 | −2.899E − 11 |
| D6 | 0.000E + 00 | D6 | 0.000E + 00 |
| D8 | 0.000E + 00 | D8 | 0.000E + 00 |
| D10 | 0.000E + 00 | D10 | 0.000E + 00 |

Diffraction Element Phase Term

TABLE 1-continued

| | |
|---|---|
| C5 | −1.100E − 03 |
| C14 | 0.000E + 00 |
| C27 | 0.000E + 00 |
| C44 | 0.000E + 00 |
| C65 | 0.000E + 00 |

If the intersection between each lens surface and the optical axis is regarded as an origin, and the optical axis direction, the direction perpendicular to the optical axis within the main scanning cross-section, and the direction perpendicular to the optical axis within the sub-scanning cross-section respectively correspond to the X-axis, the Y-axis, and the Z-axis, the aspherical shape of a main scanning cross-section of the scanning lens 7 can be expressed as:

$$X = \frac{Y^2/R}{1 + (1-(1+K)(Y/R)^2)^{1/2}} + B_4Y^4 + B_6Y^6 + B_8Y^8 + B_{10}Y^{10}$$

where R is the radius of curvature, and k and $B_4$ to $B_{10}$ are aspherical coefficients.

As described above, the two surfaces of the sub-scanning cross-section of the scanning lens 7 have an infinite radius of curvature (i.e., flat shapes).

If the lens surface coordinates in the main scanning direction are represented by Y, a radius of curvature r' of the shape of the sub-scanning cross-section of the scanning lens 7 is expressed as:

$$r' = r(1 + D_2Y^2 + D_4Y^4 + D_6Y^6 + D_8Y^8 + D_{10}Y^{10})$$

where r is the radius of curvature on the optical axis, and $D_2$ to $D_{10}$ are aspherical coefficients.

Assume that the phase function of the diffraction optical element 10 is represented by $\phi(y, z)$, the intersection between the optical axis and the diffraction surface is regarded as an origin, and the optical axis direction, the direction perpendicular to the optical axis within the main scanning cross-section, and the direction perpendicular to the optical axis within the sub-scanning cross-section respectively correspond to the x-axis, the y-axis, and the z-axis. Then, $$\Phi(y, z) = \frac{2\pi}{\lambda}\left(Cj \sum_{m,n} y^m z^n\right)$$

where m=0 to 10, and m+n≤10.

In this case, $$j = \frac{m^2 + 2mn + n^2 + m + 3m}{2}$$

Figure 5A:
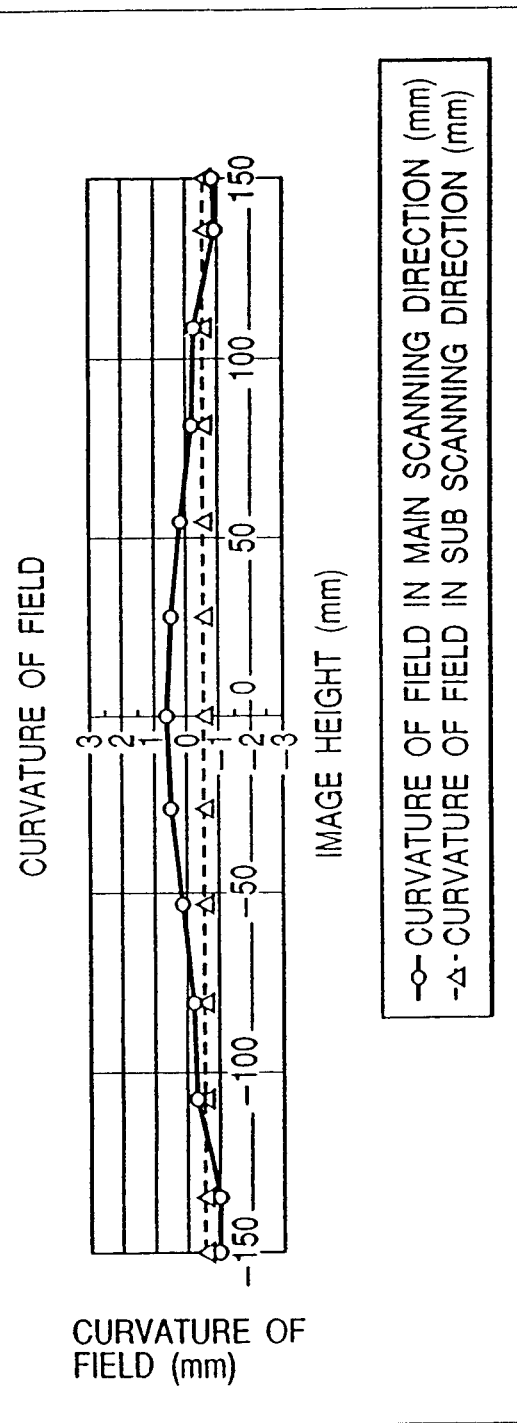
FIG. 5 is a graph showing aberrations in the first embodiment of the present invention.
Figure 5B:
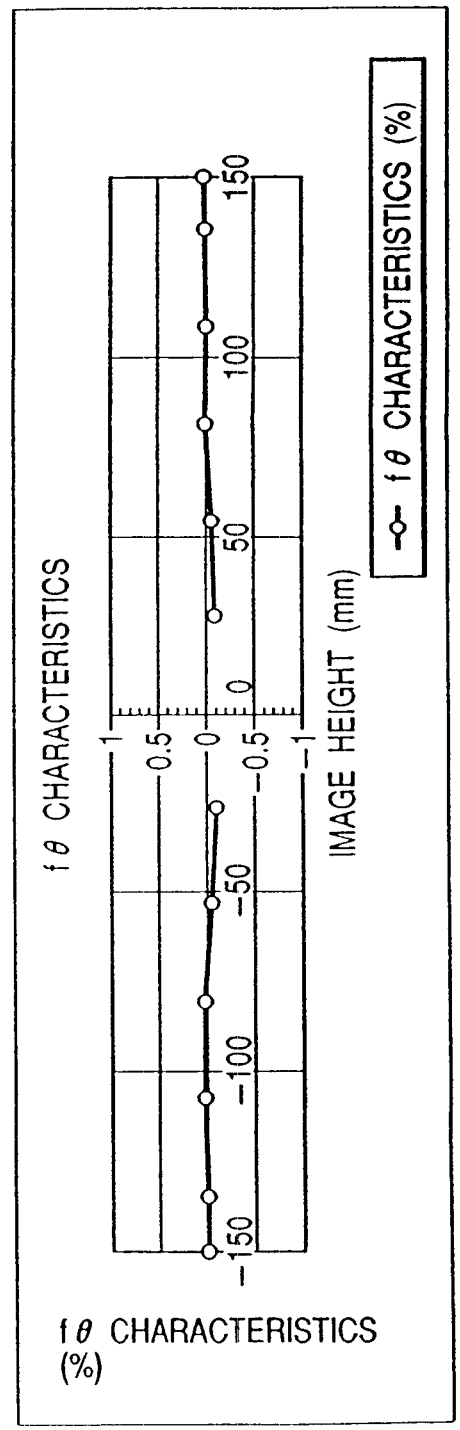

FIGS. 5A and 5B are graphs showing the curvature of field of the scanning optical system of this embodiment in the main scanning direction and sub-scanning direction and the fθ characteristics of the system.

Figure 6:
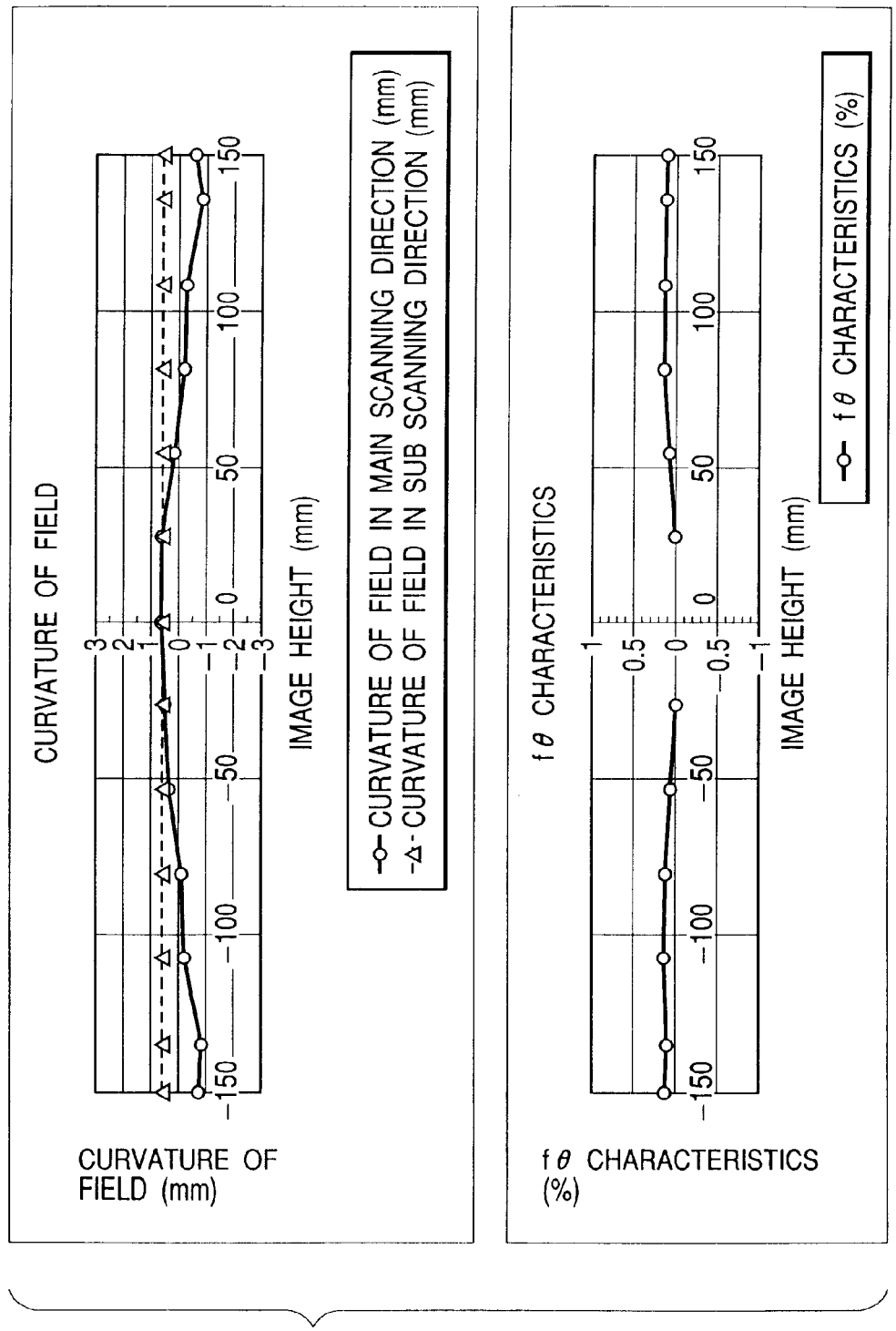
FIG. 6 is a graph showing aberrations upon a 25° C. rise in ambient temperature in the first embodiment of the present invention.
Figure 6A:
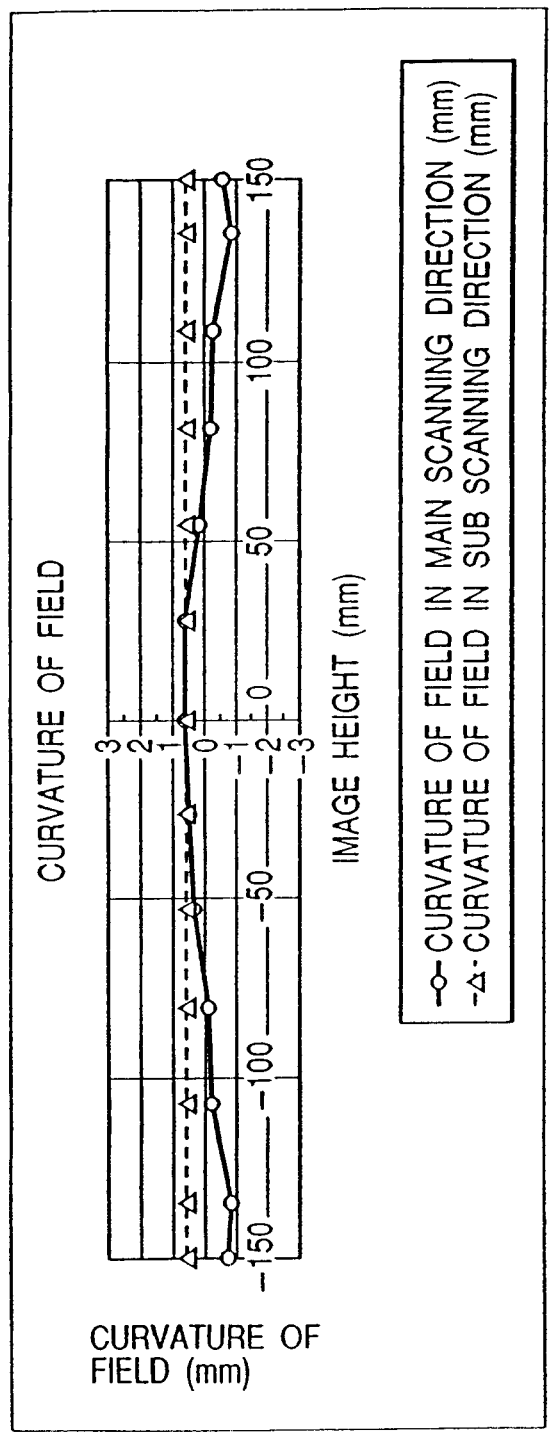
Figure 6B:
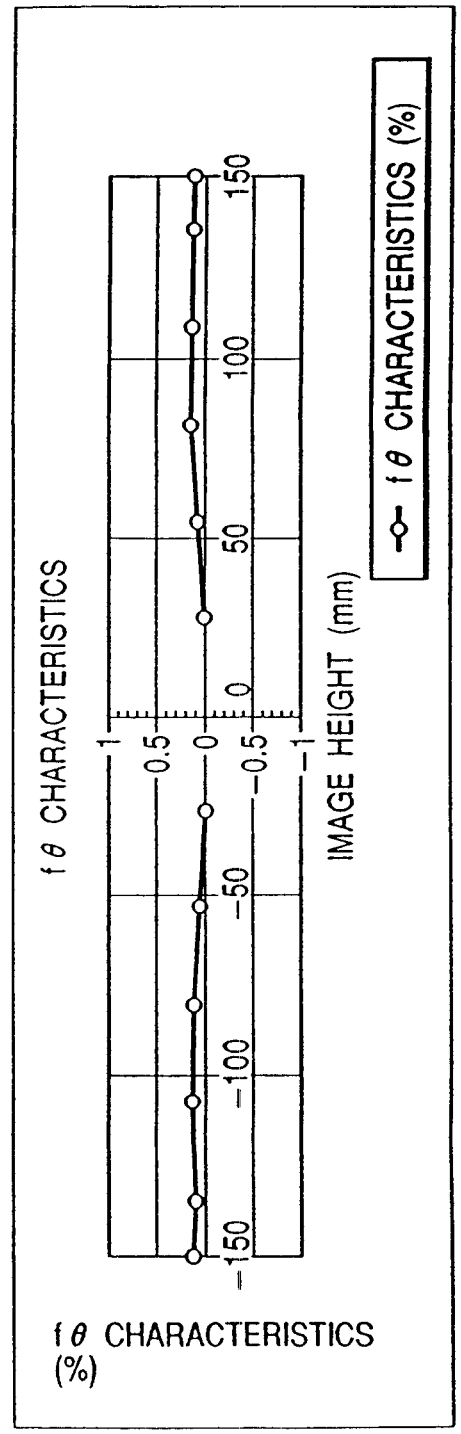

FIGS. 6A and 6B are graphs showing the curvature of field of the scanning optical system of this embodiment in the main scanning direction and sub-scanning direction and the fθ characteristics of the system upon 25° C. rise in the ambient temperature.

FIG. 7 is a view for explaining the spot shapes on the scanned surface of the scanning optical system of this embodiment. Referring to FIG. 7, an outermost line a indicates the spot shape sliced at $1/e^2$ of the peak intensity, and second and third lines b and c respectively indicate the spot shapes sliced at 50% and 90% of the peak intensity.

As is obvious from FIGS. 5 to 7, by setting the scanning optical system as in this embodiment, a deterioration in spot shape due to skew incidence of light can be effectively corrected while each aberration is properly corrected. In addition, a scanning optical system which has high environmental resistance and can attain a great reduction in cost by using an inexpensive plastic lens can be realized.

Figure 8:
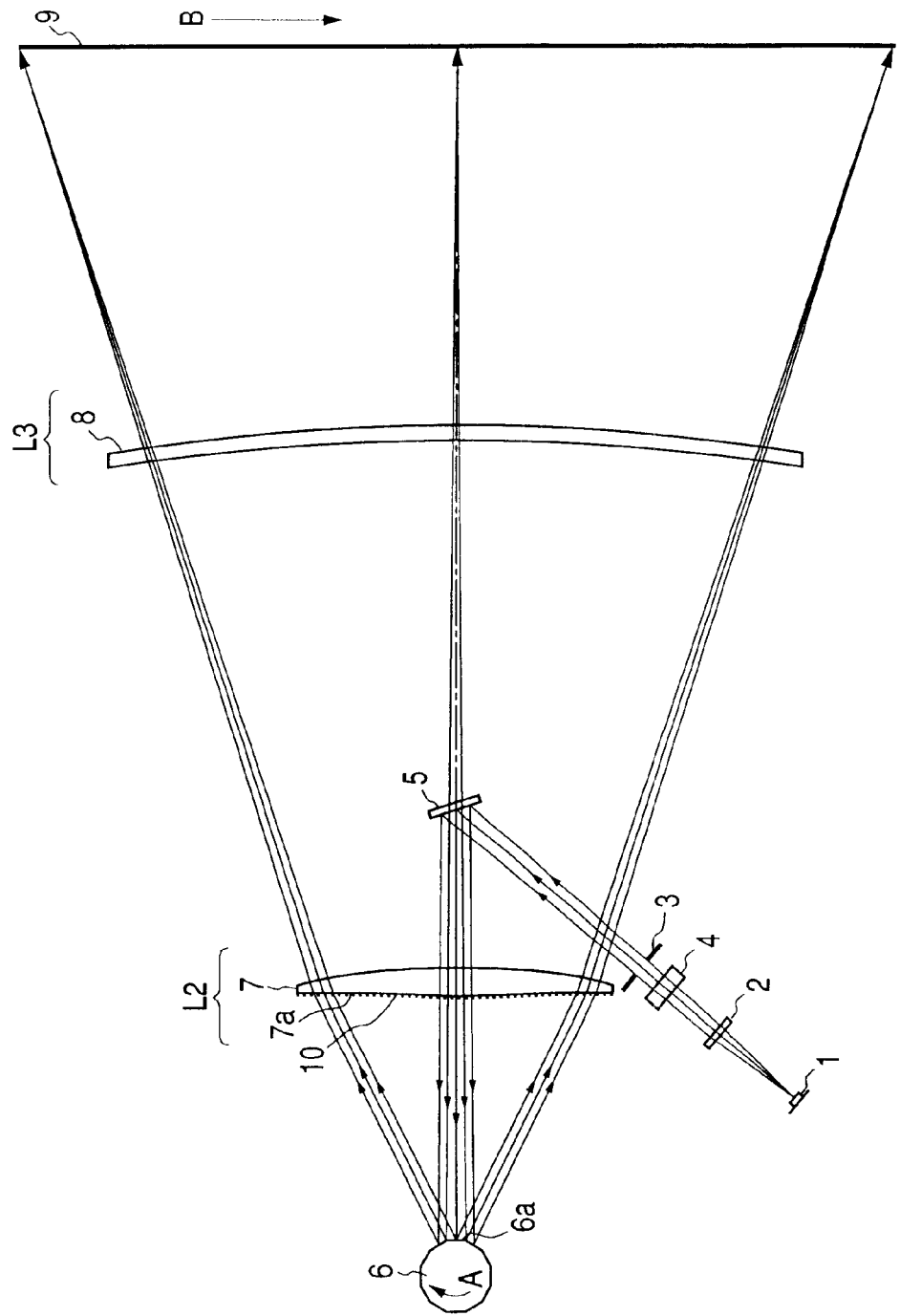
FIG. 8 is a sectional view showing the main part of the second embodiment of the present invention in the main scanning direction.
Figure 9:
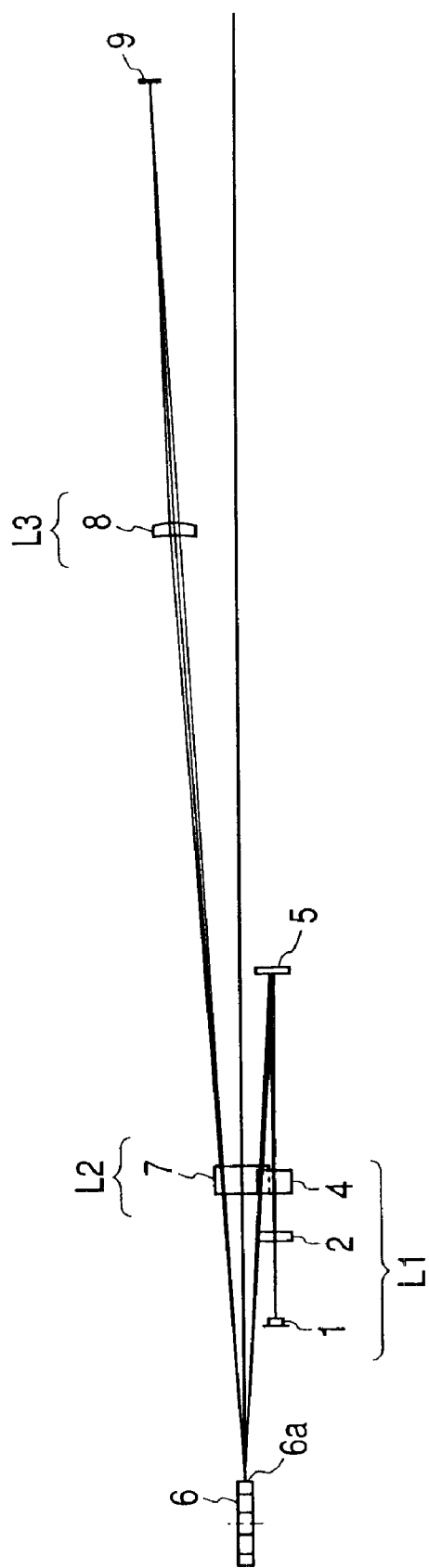
FIG. 9 is a sectional view showing the main part of the second embodiment of the present invention in the sub-scanning direction.

FIG. 8 is a sectional view showing the main part of an image forming apparatus such as a laser beam printer or digital copying machine, in the main scanning direction, to which an optical scanning system according to the second embodiment of the present invention is applied. FIG. 9 is a sectional view showing the main part of the image forming apparatus such as a laser beam printer or digital copying machine, in the sub-scanning direction, to which the optical scanning system according to the second embodiment of the present invention is applied. The same reference numerals in FIGS. 8 and 9 denote the same parts as in FIGS. 1 and 2.

This embodiment differs from the first embodiment in that a diffraction optical element is formed on that lens surface of a scanning lens as a second optical system which is located on the polygon mirror side, and the scanning lens also serves as a first optical system. The arrangement other than this and optical effects of the second embodiment are almost the same as those of the first embodiment, and hence similar effects are obtained.

Referring to FIGS. 8 and 9, a diffraction optical element 10 is formed on a lens surface 7a, of a scanning lens 7 serving as a second optical system L2, which is located on the polygon mirror side. The scanning lens 7 also serves as a first optical system L1. That is, this embodiment uses an arrangement (so-called double path) in which a weakly divergent light beam from a conversion optical element 2 passes through the scanning lens 7 as the second optical system before it strikes a polygon mirror 6.

With this arrangement, a reduction in the size of the conversion optical element 2 can be attained, and a small oblique incidence angle can be set in the sub-scanning direction. This can suppress a deterioration in spot shape on a scanning end portion in the main scanning direction due to skew incidence of light.

In the first embodiment described above, the focus shift of the scanning lens in the main scanning direction cancels out the focus shift of the diffraction optical element in the main scanning direction. With this arrangement, a focus shift in the main scanning direction can be corrected, but it is difficult to correct a deterioration in fθ characteristics.

In this embodiment, therefore, by forming the diffraction optical element 10 on the lens surface 7a, of the scanning lens 7, which is located on the polygon mirror 6 side, the ratio of the power of the scanning lens 7 to that of the diffraction optical element 10 in the main scanning direction is appropriately set so as to always keep the synthetic focal length of the scanning lens 7 and diffraction optical element 10 constant regardless of changes in ambient temperature. With this setting, both a focus shift in the main scanning direction and a deterioration in fθ characteristics can be corrected.

Table 2 shows an optical configuration in this embodiment, the aspherical coefficients of the scanning lens 7 and correction lens 8, and the phase terms of the diffraction optical element.

R, k, $B_4$ to $B_{10}$, r, $D_2$ to $D_{10}$, and Cj in Table 2 are equivalent to the coefficients in the first embodiment.

TABLE 2

| Wavelength Used | λ (nm) | 780 |
|---|---|---|
| Distance between Light Source and First Surface of Collimator lens | d0 (mm) | 34.45 |
| Thickness of Collimator Lens | d1 (mm) | 3 |
| Distance between Second Surface of Collimator Lens and First Surface of Cylindrical Lens | d2 (mm) | 20 |
| Thickness of Cylindrical Lens | d3 (mm) | 7 |
| Distance between Second Surface of Cylindrical Lens and Polygon Surface | d4 (mm) | 258.80 |
| Distance between Polygon Surface and First Surface of Scanning Lens | d5 (mm) | 90.03 |
| Thickness of Scanning Lens | d6 (mm) | 8.77 |
| Distance between Second Surface of Scanning Lens and First Surface of Correction Lens | d7 (mm) | 198.00 |
| Thickness of Correction Lens | d8 (mm) | 4.00 |
| Distance between Second Surface of Correction Lens and Scanned Surface | d9 (mm) | 139.43 |
| Refractive Index of Collimator Lens | Ncol | 1.76203 |
| Refractive Index of Cylindrical Lens | Ncyl | 1.51072 |
| Refractive Index of Scanning Lens | Nlens1 | 1.52420 |
| Refractive Index of Correction Lens | Nlens2 | 1.52420 |
| Radius of Curvature of First Surface of Collimator Lens | R1col | 0.000 |
| Radius of Curvature of Second Surface of Collimator Lens | R2col (mm) | −39.900 |
| Radius of Curvature of Second Surface of Cylindrical Lens | R1cyl (mm) | 0.000 |
| Radius of Curvature of Second Surface of Cylindrical Lens (Main Scanning) | R2cyl (mm) (mm) | 0.000 |
| Radius of Curvature of Second Surface of Cylindrical Lens (Sub-scanning) | R2cyl (s) (mm) | −53.930 |
| Shifting Amount of Correction Lens in Sub-scanning Direction | Δ(mm) | 8.00 |
| Polygon Surface Incident Angle in Sub-scanning Direction | α (deg.) | 2 |
| Polygon Surface Maximum Exit Angle | θmax (deg.) | 27 |
| Polygon (Diameter φ mm) φ27 12 surfaces | | |
| Aperture Stop Position | 10 mm away from cylindrical lens toward polygon side | |
| Diameter of Aperture Stop | 1.916 mm in Sub-scanning Direction | |

| Scanning Lens | | | |
|---|---|---|---|
| First Surface | | Second Surface | |
| R (mm) | 404.150 | R (mm) | −953.301 |
| k | 5.765E + 00 | k | −4.738E + 01 |
| B4 | −1.791E − 08 | B4 | −6.863E − 08 |
| B6 | −1.304E − 10 | B6 | −7.504E − 11 |
| B8 | 7.001E − 15 | B8 | −3.531E − 15 |
| B10 | 1.236E − 18 | B10 | 1.063E − 18 |

| Correction Lens | | | |
|---|---|---|---|
| First Surface | | Second Surface | |
| R (mm) | −1000.00 | R (mm) | −1000.000 |
| r (mm) | −142.976 | r (mm) | −37.219 |
| D2 | 0.000E + 00 | D2 | 6.019E − 06 |
| D4 | 0.000E + 00 | D4 | −2.899E − 11 |
| D6 | 0.000E + 00 | D6 | 0.000E + 00 |
| D8 | 0.000E + 00 | D8 | 0.000E + 00 |
| D10 | 0.000E + 00 | D10 | 0.000E + 00 |

| Diffraction Element Phase Term | |
|---|---|
| C5 | −5.315E − 04 |
| C14 | 6.257E + 08 |
| C27 | −2.579E − 11 |
| C44 | 2.452E − 15 |
| C65 | 2.189E − 19 |

Figure 10:
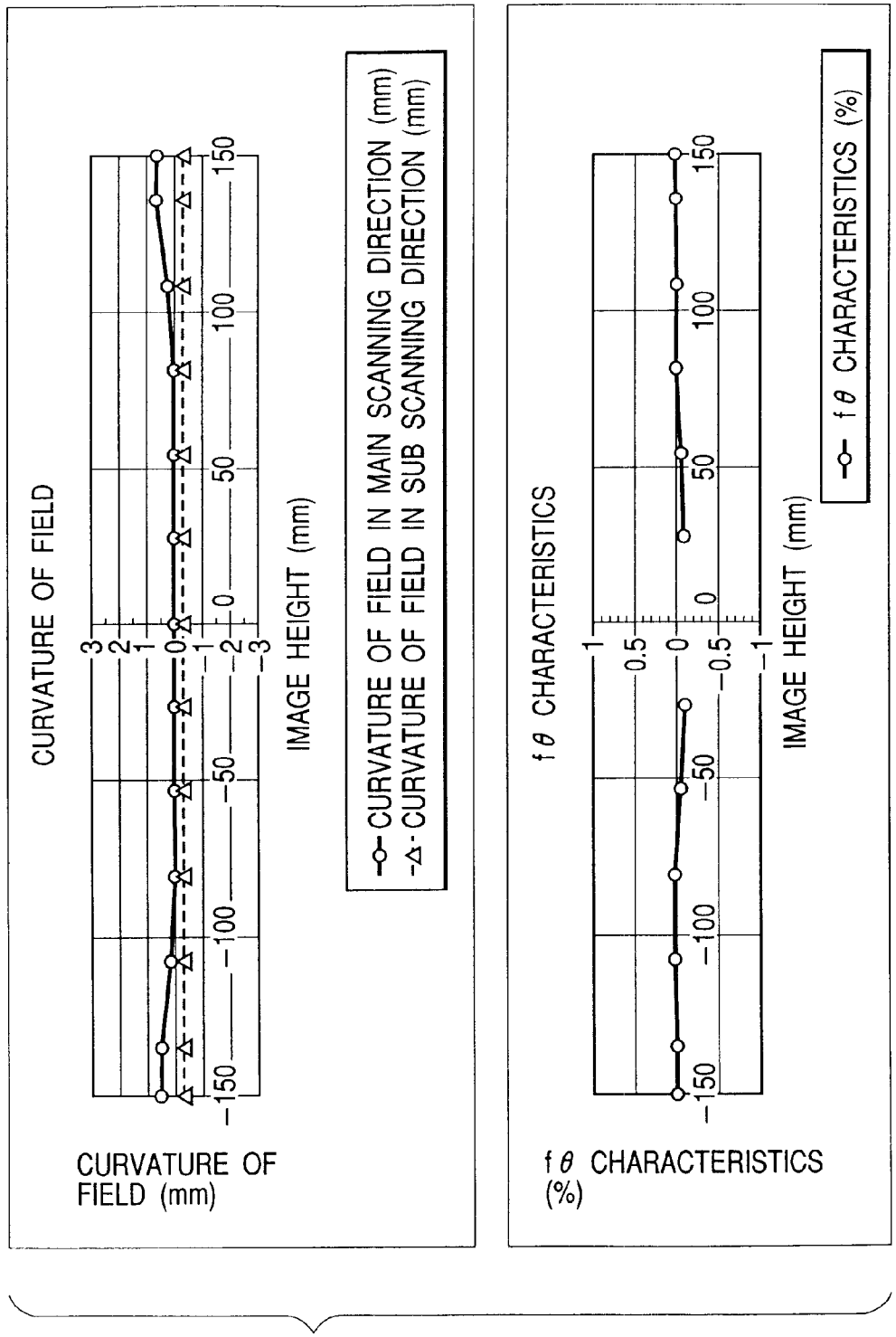
FIG. 10 is a graph showing aberrations in the second embodiment of the present invention.
Figure 10A:
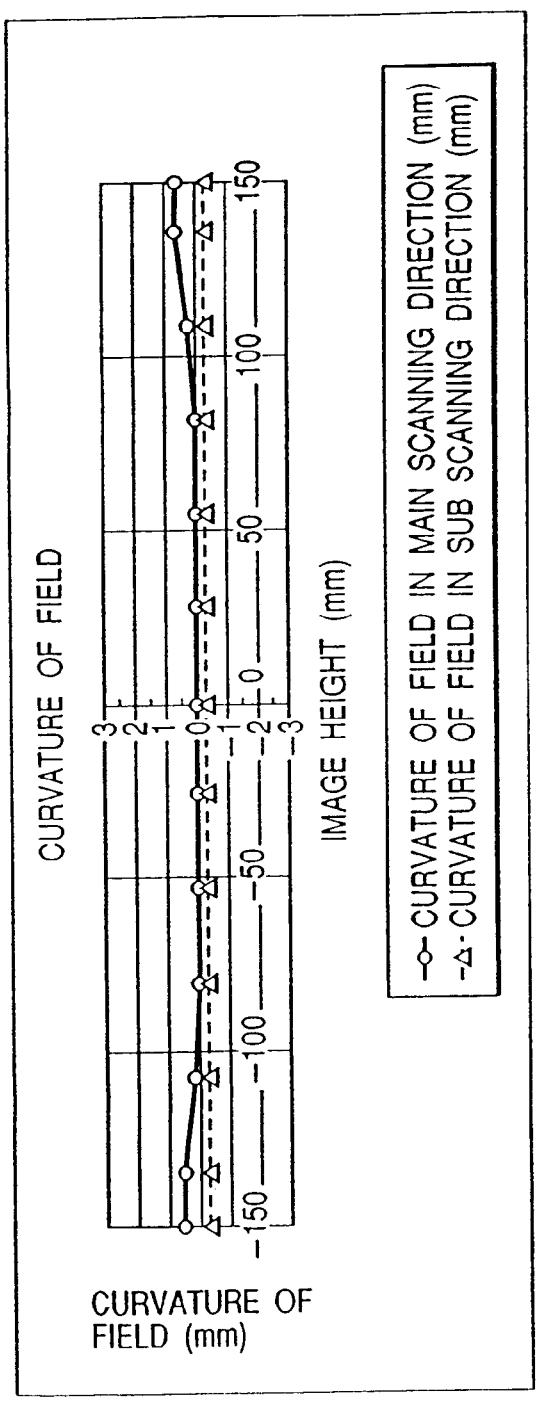
Figure 10B:
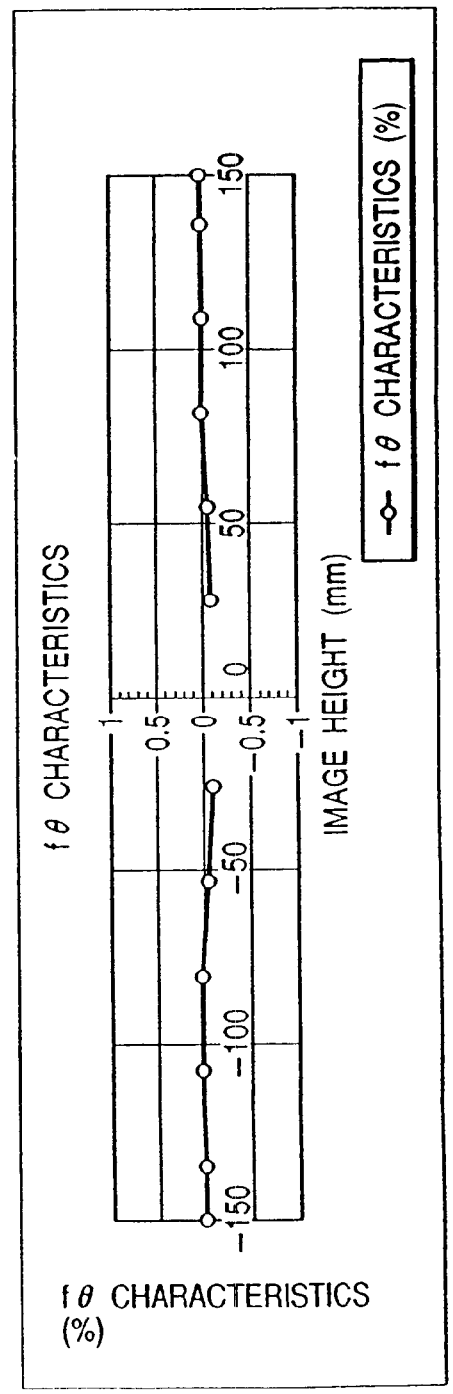

FIGS. 10A and 10B are graphs showing the curvature of field of the scanning optical system of this embodiment in the main scanning direction and sub-scanning direction and the fθ characteristics of the system.

Figure 11:
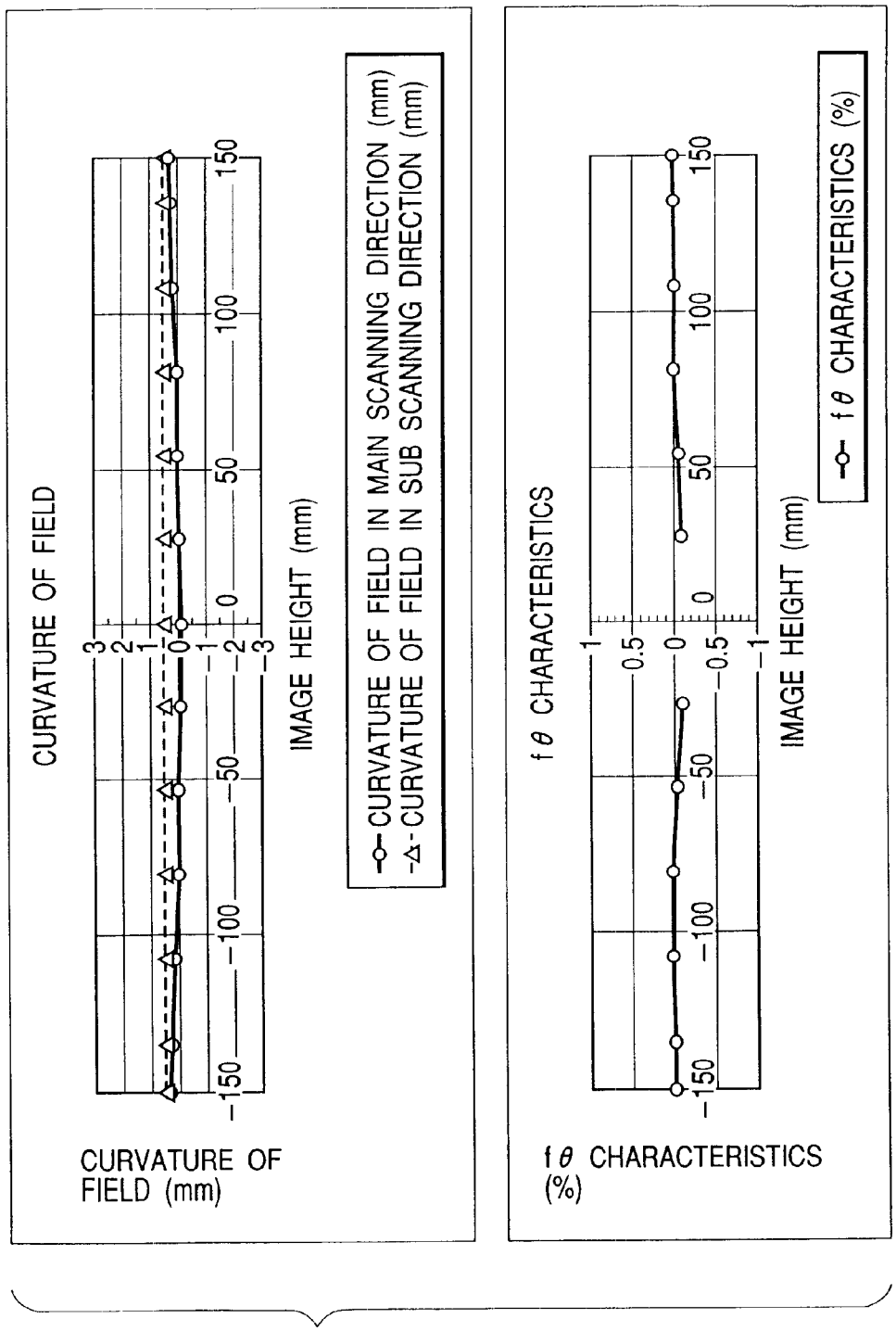
FIG. 11 is a graph showing aberrations upon a 25° C. rise in ambient temperature in the second embodiment of the present invention.
Figure 11A:
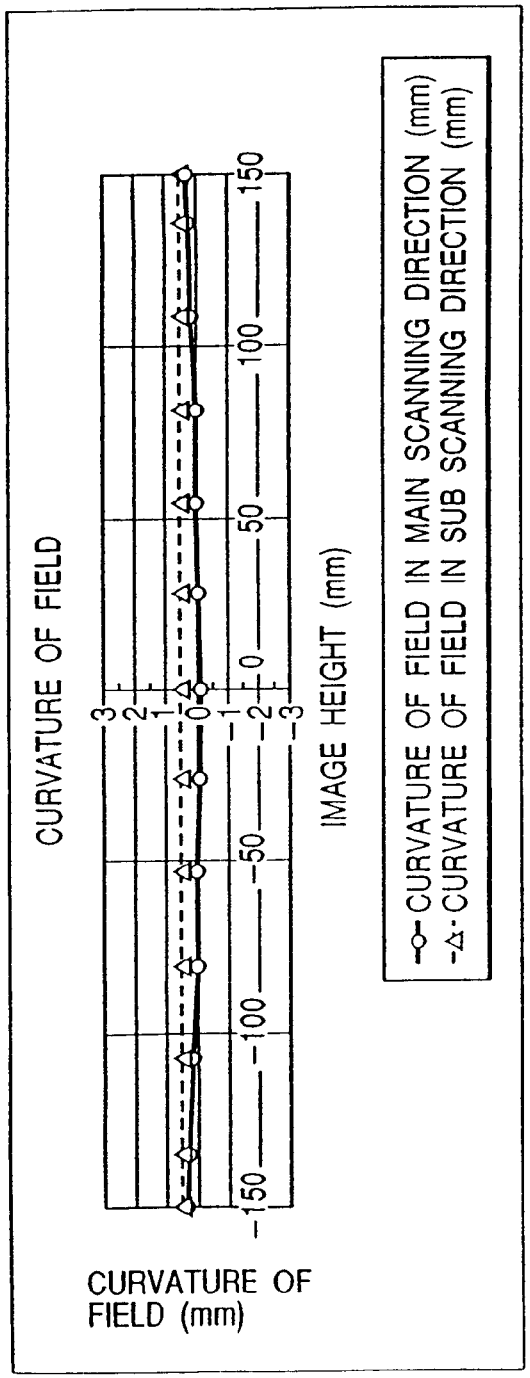
Figure 11B:
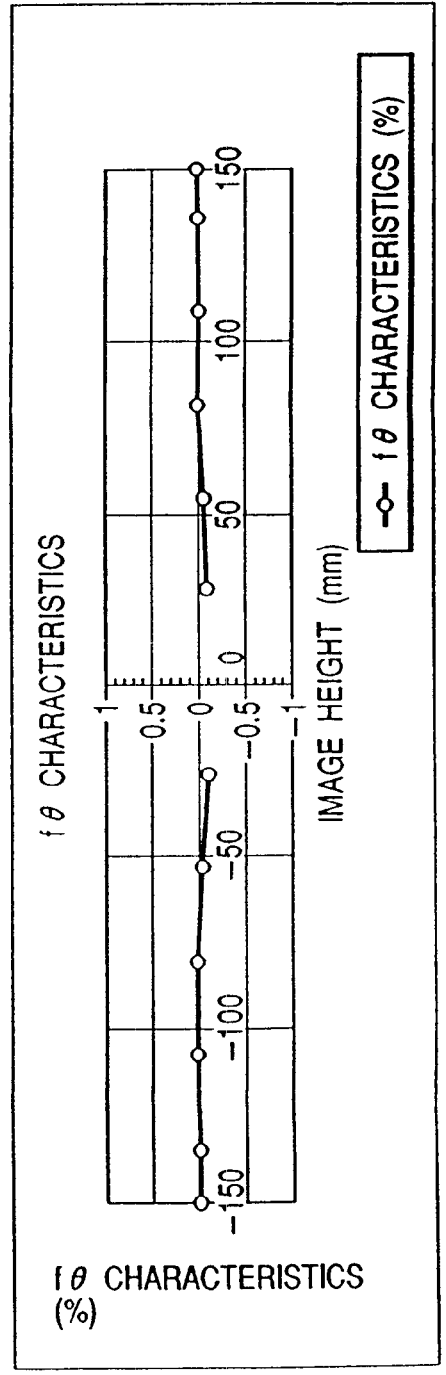

FIGS. 11A and 11B are graphs showing the curvature of field of the scanning optical system of this embodiment in the main scanning direction and sub-scanning direction and the fθ characteristics of the system upon 25° C. rise in the ambient temperature.

Figure 12:
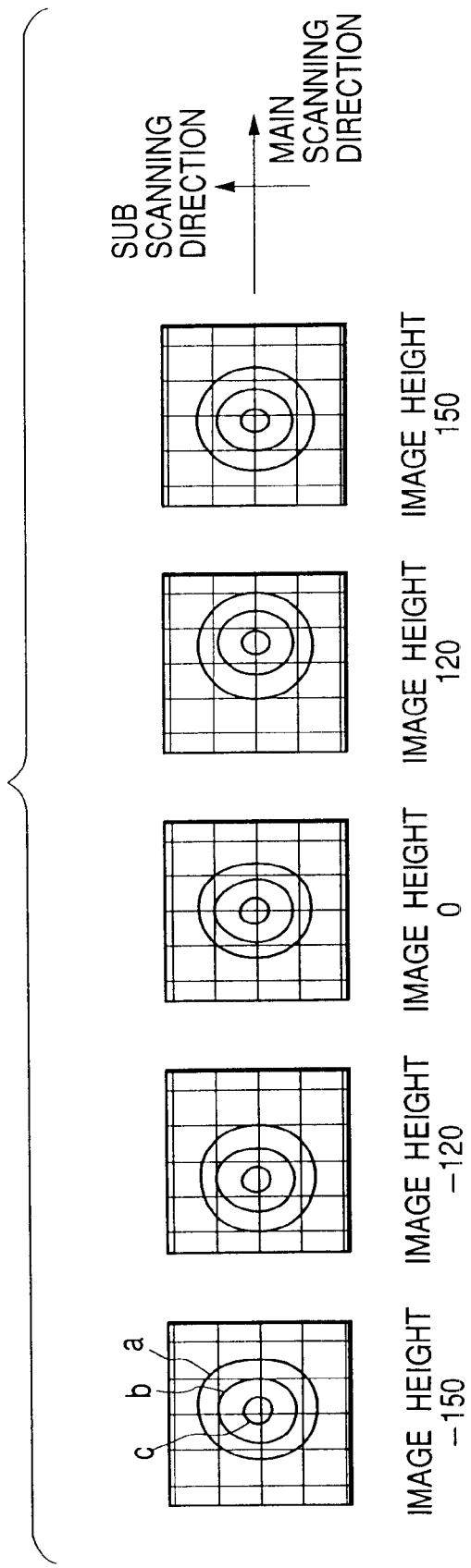
FIG. 12 is a view for explaining the spot shapes in the second embodiment of the present invention.

FIG. 12 is a view for explaining the spot shapes on the scanned surface of the scanning optical system of this embodiment. Referring to FIG. 12, an outermost line a indicates the spot shape sliced at $1/e^2$ of the peak intensity, and second and third lines b and c respectively indicate the spot shapes sliced at 50% and 90% of the peak intensity.

As is obvious from FIGS. 10 to 12, by setting the scanning optical system as in this embodiment, a deterioration in spot shape due to skew incidence of light can be effectively corrected while each aberration is properly corrected. In addition, there is provided a scanning optical system which has high environmental resistance and can correct fθ characteristics as well as focus variations even if a plastic lens is used for the scanning optical system.

In this embodiment, the diffraction optical element 10 is formed on a surface of the scanning lens 7. However, the present invention is not limited to this. For example, this element may be independently inserted in the optical path.

This embodiment uses the diffraction optical element having a power in the main scanning direction. However, the present invention is not limited to this. For example, a diffraction optical element having powers in both the main scanning direction and sub-scanning direction may be used.

Figure 13:
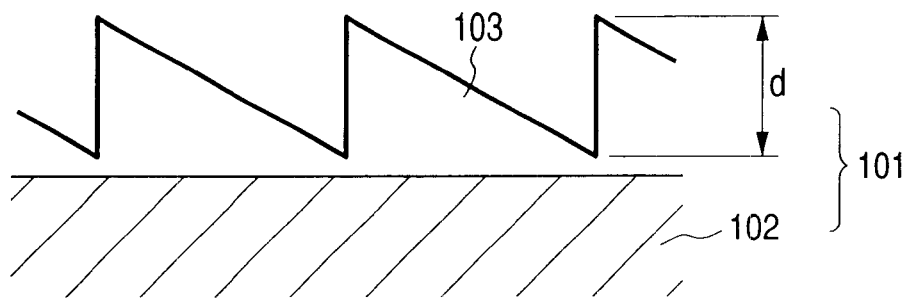
FIG. 13 is a view for explaining a diffraction optical element according to the present invention.
Figure 15:
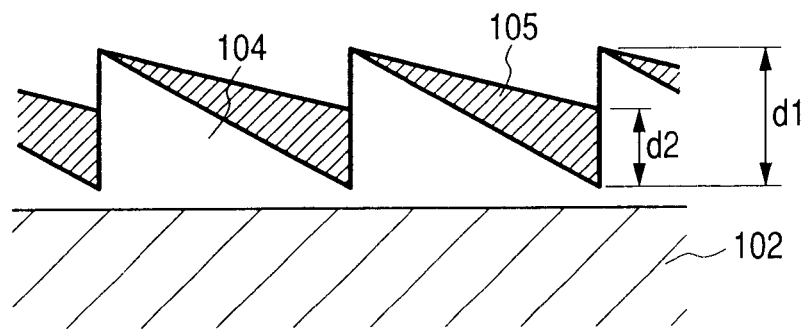
FIG. 15 is a view for explaining a diffraction optical element according to the present invention.

As the structure of the diffraction optical element used in this embodiment, a single-layer structure in the form of a single-layer kinoform shown in FIG. 13, a double-layer structure in which two layers having different (or same) grating thicknesses are stacked on each other as shown in FIG. 15, or the like can be used.

Figure 14:
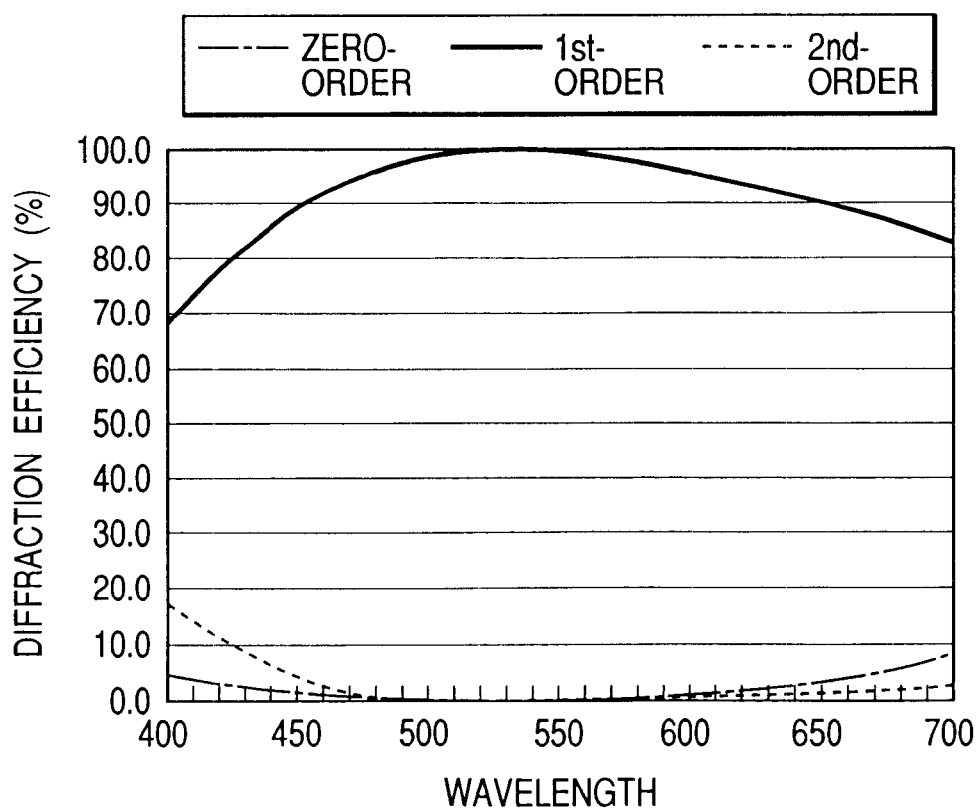
FIG. 14 is a graph for explaining the wavelength dependence of the diffraction optical element according to the present invention.

FIG. 14 shows the wavelength dependence of the 1st-order diffracted light diffraction efficiency of a diffraction optical element 101 in FIG. 13. According to the actual structure of the diffraction optical element 101, the surface of a base member 102 is coated with an ultraviolet curing resin, and a layer 103 having a grating thickness d that exhibits a 1st-order diffracted light diffraction efficiency of 100% at a wavelength of 530 nm is formed on the resin portion.

As is obvious from FIG. 14, with increasing difference from the optimal wavelength 530 nm, the diffraction efficiency for the designed order decreases whereas the diffraction efficiency for 0th- and 2nd-order diffracted light beams near the designed order increases. Increases in light beams of the orders other than the designed order result in flare. This leads to a decrease in the resolution of the optical system.

Figure 16:
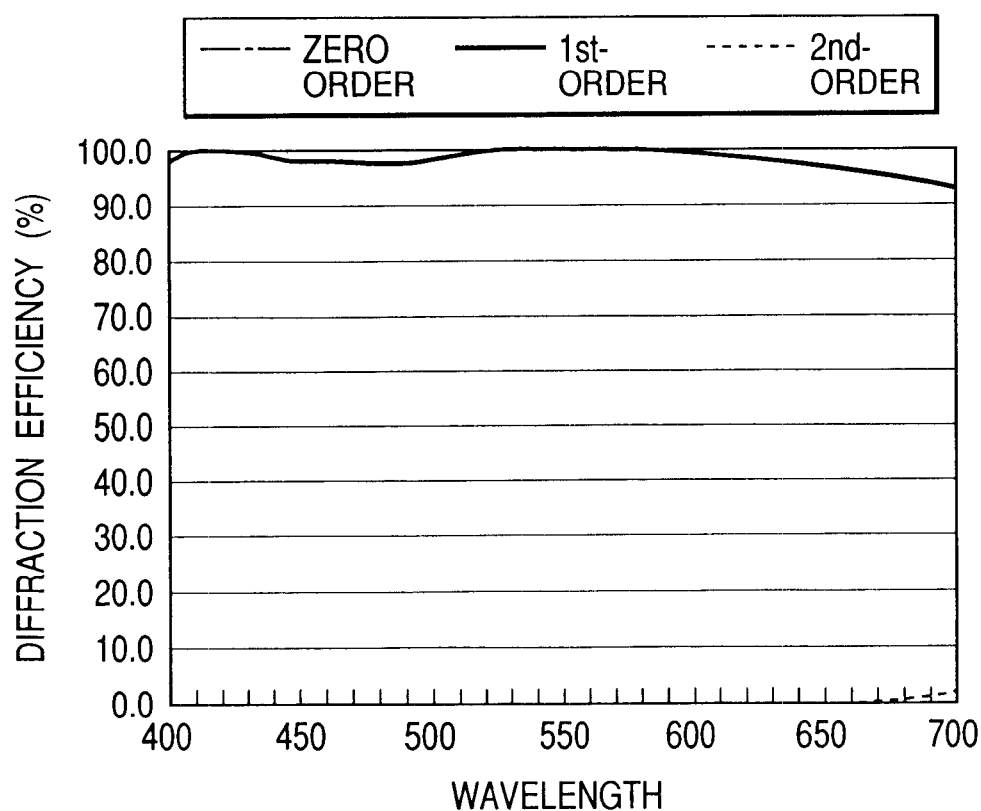
FIG. 16 is a graph for explaining the wavelength dependence of the diffraction optical element according to the present invention.

FIG. 16 shows the wavelength dependence of the 1st-order diffracted light diffraction efficiency in a diffraction optical element of a multilayer structure in which two layers 104 and 105 are stacked on each other, as shown in FIG. 15.

Referring to FIG. 15, a first layer 104 made of an ultraviolet resin (nd=1.499 and vd=54) is formed on a base member 102, and a second layer 105 made of another ultraviolet curing resin (nd=1.598 and vd=28) is formed on the layer 104. According this combination of materials, a grating thickness of d1 of the first layer 104 is d1=13.8 μm, and a grating thickness of d2 of the second layer 105 is d2=10.5 μm.

As is obvious from FIG. 16, with the use of a diffraction optical element having a multilayer structure, the diffraction efficiency for the designed order is as high as 95% or more throughout the overall wavelengths used.

Figure 17:
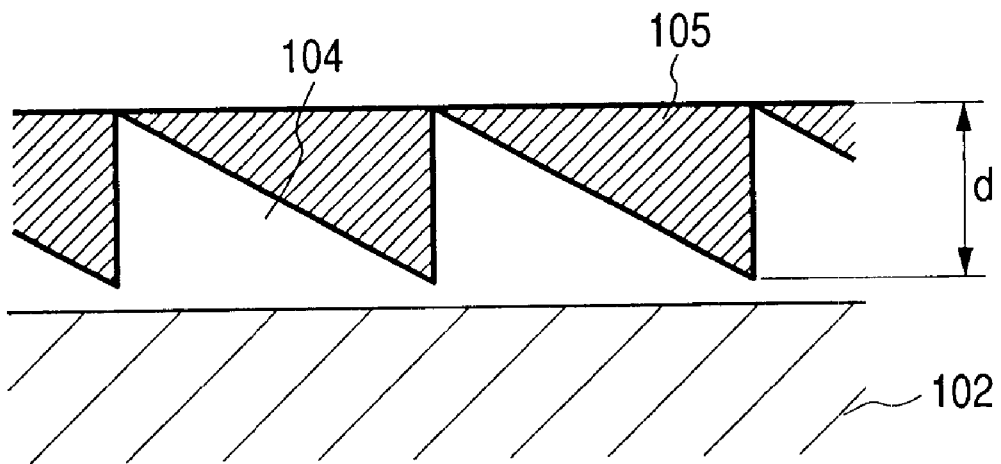
FIG. 17 is a view for explaining a diffraction optical element according to the present invention.

Note that a material for the above diffraction optical element having a multilayer structure is not limited to an ultraviolet curing resin. For example, another plastic material or the like can be used. The first layer 104 may be directly formed on a base member depending on the base member. In addition, the respective grating thicknesses need not always be different, and the two layers 104 and 105 may have the same grating thickness, as shown in FIG. 17, depending on the combination of materials.

In this case, since no grating structure is formed on the surface of the diffraction optical element, a dustproof diffraction optical element can be obtained, and its assembly workability can be improved.

According to the present invention, as described above, a scanning lens as a second optical system is formed from one plastic lens in a sub-scanning oblique incident optical system, and more specifically, an over field scanning optical system, and the shape of the lens is properly set to attain a reduction in cost and correct fθ characteristics, curvature of field, and the like. In addition, spot deformation due to oblique incidence of light in the sub-scanning direction is effectively corrected by forming a correction lens as a third optical system by using a single plastic lens and optimizing its shape, position, and the like, and a diffraction optical element is formed in at least the first or second optical system, thereby realizing a high-quality optical scanning system having high environmental resistance and an image forming apparatus using the same.

What is claimed is:

1. A scanning optical system comprising:
    a first optical system for shaping a light beam emitted from light source means and forming the light beam into a linear image, which is elongated in the same direction as a main scanning direction;
    a light deflector, which has a deflection surface at or near an imaging position of said first optical system, and which deflectively scans the incident light beam in the main scanning direction;
    a second optical system for forming the light beam deflected by said light deflector into an image on a scanned surface in the main scanning direction; and
    a third optical system for forming the light beam deflected by said light deflector into an image on the scanned surface in a subscanning direction and setting the deflection surface of said light deflector and the scanned surface optically so as to be conjugate with each other,
    wherein the light beam guided by said first optical system is made to strike said light deflector at a predetermined angle with respect to a plane perpendicular to a rotational axis of said light deflector,
    wherein said third optical system comprises at least one lens,
    wherein said at least one lens of said third optical system is positioned to make a light beam strike said at least one lens of said third optical system at a position shifted from a surface vertex in a subscanning cross-section of said at least one lens of said third optical system by a predetermined amount in the subscanning direction to correct a deterioration in a spot shape on a scanning end portion in the main scanning direction,
    wherein said second optical system is located closer to said light deflector than half the distance between said light deflector and the scanned surface, and
    wherein $|\phi 2S| \leq 0.001$ where $\phi 2S$ is a refracting power of said second optical system in the subscanning direction.

2. A scanning optical system comprising:
    a first optical system for shaping a light beam emitted from light source means and forming the light beam into a linear image, which is elongated in the same direction as a main scanning direction;
    a light deflector, which has a deflection surface at or near an imaging position of said first optical system, and which deflectively scans the incident light beam in the main scanning direction;
    a second optical system for forming the light beam deflected by said light deflector into an image on a second surface in the main scanning direction; and
    a third optical system for forming the light beam deflected by said light deflector into an image on the scanned surface in a subscanning direction and setting the deflection surface of said light deflector and the scanned surface optically so as to be conjugate with each other,
    wherein the light beam guided by said first optical system is made to strike said light deflector at a predetermined angle with respect to a plane perpendicular to a rotational axis of said light deflector,
    wherein said third optical system comprises at least one lens,
    wherein said at least one lens of said third optical system is positioned such that in a subscanning cross-section of said at least one lens of said third optical system a light beam incident on said at least one lens makes a predetermined angle with an optical axis of said at least one lens in the subscanning cross section to correct a deterioration in a spot shape a scanning end portion in the main scanning direction,
    wherein said second optical system is located closer to said light deflector than half the distance between said light deflector and the scanned surface, and
    wherein $|\phi 2S| > 0.001$ where $\phi 2S$ is a refracting power of said second optical system in the subscanning direction.

3. A scanning optical system according to either claim 1 or 2, wherein the light beam incident on said light deflector is incident from substantially a center of a scanning range along the main scanning direction, and a width of the light beam exceeding a width of the deflection surface of said light deflector in the main scanning direction.

4. A scanning optical system according to either claim 1 or 2, wherein each of said second optical system and said third system includes at least one lens.

5. A scanning optical system according to claim 4, wherein a material forming said at least one lens of said second optical system comprises a plastic material.

6. A scanning optical system according to claim 4, wherein a material forming said at least one lens of said third optical system comprises a plastic material.

7. A scanning optical system according to either claim 1 or 2, wherein a diffraction optical element is disposed in said first optical system.

8. A scanning optical system according to claim 4, wherein a diffraction optical element is disposed in said second optical system.

9. A scanning optical system according to claim 4, wherein $|\phi 3M| \leq 0.001$ where $\phi 3M$ is a refracting power of said at least one lens of said third optical system in the main scanning direction.

10. A scanning optical system according to either claim 1 or 2, wherein a diffraction optical element functions to cancel out an aberration variation, caused in said second optical system by an environmental variation, by using a variation in a wavelength of said light source means due to the environmental variation.

11. A scanning optical system according to claim 4, wherein said at least one lens of said third optical system is located closer to the scanned surface than half the distance between said light deflector and the scanned surface.

12. A scanning optical system according to claim 4, wherein a radius of curvature of at least one surface of a subscanning cross-section of said at least one lens of said third optical system continuously changes with a distance from a lens optical axis in the main scanning direction.

13. A scanning optical system according to either claim 1 or 2, wherein said at least one lens of said second optical system performs a function of said first optical system.

14. A scanning optical system according to either claim 1 or 2, wherein each of two surfaces of a subscanning cross-section of said at least one lens of said third optical system is a flat surface.

15. A scanning optical system according to claim 4, wherein each of two surfaces of a main scanning cross-section of said at least one lens of said third optical system is an arcuate surface.

16. A scanning optical system according to either claim 1 or 2, further comprising a bending mirror disposed in an optical path between said light source means and said light deflector.

17. An image forming apparatus comprising a scanning optical system according to either claim 1 or 2 and a photosensitive drum as the scanned surface.

18. An image forming apparatus comprising a scanning optical system according to claim 3 and a photosensitive drum as the scanned surface.

* * * * *

UNITED STATES PATENT AND TRADEMARK OFFICE
CERTIFICATE OF CORRECTION

PATENT NO.    : 6,633,423 B2
DATED         : October 14, 2003
INVENTOR(S)   : Yoshihiro Ishibe It is certified that error appears in the above-identified patent and that said Letters Patent is hereby corrected as shown below:

<u>Title page,</u>
Item [56], References Cited, U.S. PATENT DOCUMENTS, insert
-- 6,445,483 9/2002 Takada --.

<u>Column 10,</u>
Line 25, "R2cyl (mm)" should read -- R2cyl (m) (mm) --.

<u>Column 13,</u>
Line 5, "34.45" should read -- 37.45 --.
Line 23, "R1col 0.000" should read -- R1col (mm) 0.000 --.
Line 28, "R2cyl (mm)" should read -- R2cyl (m)(mm) --.
       (mm)

<u>Column 16,</u>
Line 47, "|φ2S|0.001" should read -- |φ2S|≤0.001 --.

Signed and Sealed this

Ninth Day of March, 2004

JON W. DUDAS
*Acting Director of the United States Patent and Trademark Office*